United States Patent
Sasahara et al.

(10) Patent No.: US 8,240,414 B2
(45) Date of Patent: Aug. 14, 2012

(54) ELECTRIC LAWN MOWER HAVING A SUB FRAME SUPPORTING TRANSAXLES AND MOTOR DRIVERS

(75) Inventors: Kengo Sasahara, Hyogo (JP);
Tomoyuki Ebihara, Hyogo (JP);
Mitsuhiro Nakagaki, Osaka (JP);
Kazuma Moriguchi, Osaka (JP); Keiji Matsumoto, Osaka (JP)

(73) Assignees: Yanmar Co., Ltd., Osaka (JP); Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 13/113,460

(22) Filed: May 23, 2011

(65) Prior Publication Data
US 2011/0289896 A1  Dec. 1, 2011

Related U.S. Application Data

(60) Provisional application No. 61/348,921, filed on May 27, 2010.

(51) Int. Cl.
*B60K 1/00* (2006.01)
*B60K 16/00* (2006.01)
*B60L 8/00* (2006.01)
(52) U.S. Cl. ........................................ 180/65.31; 701/22
(58) Field of Classification Search .................. 180/65.6, 180/65.1, 210, 65.5, 6.5, 65.31, 291, 292, 180/65.285, 6.48, 65.245; 60/491; 701/22, 701/1; 310/156.35; 56/11.9, 10.6; 322/24
See application file for complete search history.

(56) References Cited

U.S. PATENT DOCUMENTS

| | | | | |
|---|---|---|---|---|
| 3,375,645 A | * | 4/1968 | Miller | 56/16.2 |
| 4,415,049 A | * | 11/1983 | Wereb | 180/6.5 |
| 5,036,938 A | * | 8/1991 | Blount et al. | 180/208 |
| 5,367,861 A | * | 11/1994 | Murakawa et al. | 56/11.8 |
| 6,089,341 A | * | 7/2000 | Gingerich | 180/65.1 |
| 6,604,348 B2 | * | 8/2003 | Hunt | 56/10.6 |
| 6,734,647 B2 | * | 5/2004 | Wakitani et al. | 318/432 |
| 7,195,087 B2 | * | 3/2007 | Hatsuda et al. | 180/65.285 |
| 7,406,825 B1 | * | 8/2008 | Hauser | 60/487 |
| 7,613,552 B2 | * | 11/2009 | Bernini | 701/23 |
| 7,677,344 B2 | * | 3/2010 | Medina et al. | 180/167 |
| 7,798,259 B2 | * | 9/2010 | Iida et al. | 180/6.2 |
| 2009/0078485 A1 | * | 3/2009 | Gutsch et al. | 180/218 |
| 2009/0201650 A1 | * | 8/2009 | Hauser et al. | 361/736 |
| 2009/0301076 A1 | * | 12/2009 | Yasuda et al. | 60/491 |
| 2010/0025131 A1 | * | 2/2010 | Gloceri et al. | 180/65.28 |
| 2010/0206649 A1 | * | 8/2010 | Ishii | 180/65.31 |
| 2010/0236845 A1 | * | 9/2010 | Ishii et al. | 180/65.6 |
| 2011/0247886 A1 | * | 10/2011 | Sasahara et al. | 180/6.5 |

FOREIGN PATENT DOCUMENTS

DE  102004015277 A1 * 12/2004
JP  2004166547 A * 6/2004

* cited by examiner

*Primary Examiner* — Arpad Fabian-Kovacs
(74) *Attorney, Agent, or Firm* — Sterne, Kessler, Goldstein & Fox P.L.L.C.

(57) ABSTRACT

An electric lawn mower includes a main frame, a mower deck supported by the main frame, a castor supported by the main frame, a sub frame, a pair of transaxles, and a pair of motor drivers. Each of the transaxles includes a transaxle housing, an electric motor disposed in the transaxle housing, a single axle supported by the transaxle housing, and a drive wheel fixed on the axle outside of the transaxle housing. The motor drivers supply electric power to the respective motors of the respective transaxles. The sub frame, supporting the transaxles and the motor drivers, is connected to the main frame.

22 Claims, 14 Drawing Sheets

ELECTRIC LAWN MOWER HAVING A SUB FRAME SUPPORTING TRANSAXLES AND MOTOR DRIVERS

CROSS REFERENCE TO RELATED APPLICATION

This application claims the benefit of U.S. Provisional Application No. 61/348,921, filed May 27, 2010, which is hereby incorporated by reference in its entirety.

BACKGROUND OF THE INVENTION

1. Field of the Invention

The present invention relates to an electric lawn mower equipped with a pair of right and left transaxles, each of which supports a single axle and incorporates an electric motor for driving the axle.

2. Related Art

There are conventional electric lawn mowers equipped with a pair of right and left transaxles carrying respective right and left drive wheels. The right and left transaxles are provided with respective electric motors for driving the respective drive wheels. To drive and control the electric motors of the right and left transaxles, each of the conventional electric lawn mowers is further equipped with a controller, a battery, and motor drivers, which occupy a large part of weight of the electric lawn mower.

However, these electric components for driving the drive wheels are severally mounted onto a vehicle body frame of the lawn mower so as to increase labor and processes for manufacturing the lawn mowers. Further, wiring among the electric components may be complicated or elongated so as to reduce efficiency of transmitting electric power to the electric motors and to increase costs and labor. Further, location of the heavy electric components must be considered to ensure a required weight balance of the lawn mower.

BRIEF SUMMARY OF THE INVENTION

An electric lawn mower according to the invention comprises a main frame, a mower deck supported by the main frame, a castor supported by the main frame, a sub frame, a pair of transaxles, and a pair of motor drivers. Each of the transaxles includes a transaxle housing, an electric motor disposed in the transaxle housing, a single axle supported by the transaxle housing, and a drive wheel fixed on the axle outside of the transaxle housing. The motor drivers supply electric power to the respective motors of the respective transaxles. The sub frame, supporting the transaxles and the motor drivers, is connected to the main frame. Therefore, the electric lawn mower is advantageous in assembling components for driving the axles because mounting the transaxles and motor drivers onto the electric lawn mower can be easily completed only by connecting the sub frame supporting the transaxles and motor drivers to the main frame.

The electric lawn mower further comprises a controller supported by the sub frame to control the motor drivers. Therefore, mounting the controller onto the electric lawn mower can be easily completed only by connecting the sub frame supporting the controller to the main frame, and a wiring between the controller and the motor drivers can be shortened to enhance efficiency of transmitting electric power to the electric motors and to reduce costs and labor.

The electric lawn mower further comprises a battery supported by the sub frame to serve as an electric power source for the motor drivers. Therefore, mounting the battery onto the electric lawn mower can be easily completed only by connecting the sub frame supporting the battery to the main frame, and a wiring between the battery and the motor drivers (and the controller) can be shortened to enhance efficiency of transmitting electric power to the electric motors and to reduce costs and labor.

Further, in the electric lawn mower equipped with the battery, the mower deck is supported by the main frame between the castor and the drive wheels, and the battery is supported by the sub frame between the mower deck and the drive wheels. Therefore, a dead space on or in the sub frame between the mower deck and the drive wheels is utilized for a compact arrangement of the battery in the lawn mower and for ensuring an appropriate weight balance for the lawn mower.

Further, the battery is supported by the sub frame between the transaxles. Therefore, a dead space on or in the sub frame between the transaxles is utilized for a compact arrangement of the battery in the lawn mower and for ensuring an appropriate weight balance for the lawn mower.

The electric lawn mower further comprises a grass tank and a grass-discharging duct extended from the mower deck to the grass tank between the transaxles. Therefore, if the electric lawn mower is a rear-discharging type lawn mower equipped at a rear end thereof with the grass tank, for example, a dead space in or on the sub frame between the transaxles is utilized for a compact arrangement of the grass-discharging duct in the lawn mower while this space is used for arrangement of electric components such as the motor drivers for driving the axles.

In the electric lawn mower, each of the transaxles further includes a motor shaft of the motor and a cooling fan. The motor shaft is supported in the transaxle housing and has a portion projecting outward from the transaxle housing. The cooling fan is provided on the portion of the motor shaft so as to be disposed adjacent to each of the motor drivers. Therefore, the portion of the motor shaft projecting outward from the transaxle housing is utilized for arranging the motor drivers thereon so as to efficiently cool the motor drivers.

In the electric lawn mower, the transaxle housing of each of the transaxles is filled with oil, and the corresponding motor driver is exposed to the oil in the transaxle housing. Therefore, each of the motor drivers can be efficiently cooled by the oil in the transaxle housing.

Further, each of the transaxles is provided with a cable whose connection to the motor and the motor driver is free from the oil in the transaxle housing. Therefore, the electric connection of the motor and the motor driver with the cable can be protected from the oil in the transaxle housing.

Further, the motor and the motor driver have respective portions connected to the cable outside of the transaxle housing of each of the transaxles. Therefore, the portions of the motor and the motor driver connected to the cable are surely free from the oil in the transaxle housing. Further the cable can also be entirely disposed outside of the transaxle housing so as to be free from the oil in the transaxle housing.

Alternatively, the motor and the motor driver are provided with respective oil-resisting cable connection guides for guiding connection of the cable to the motor and the motor driver freely from the oil in the transaxle housing. Therefore, even if the cable is extended in the transaxle housing so as to be exposed to the oil in the transaxle housing, the oil-resisting cable connection guides surely protect an electrical connection portion of the motor to the cable and an electrical connection portion of the motor driver to the cable from the oil.

Further and other objectives, features, and advantages of the invention will appear more fully in the following detailed description with reference to drawings.

DETAILED DESCRIPTION OF THE INVENTION

Figure 1:
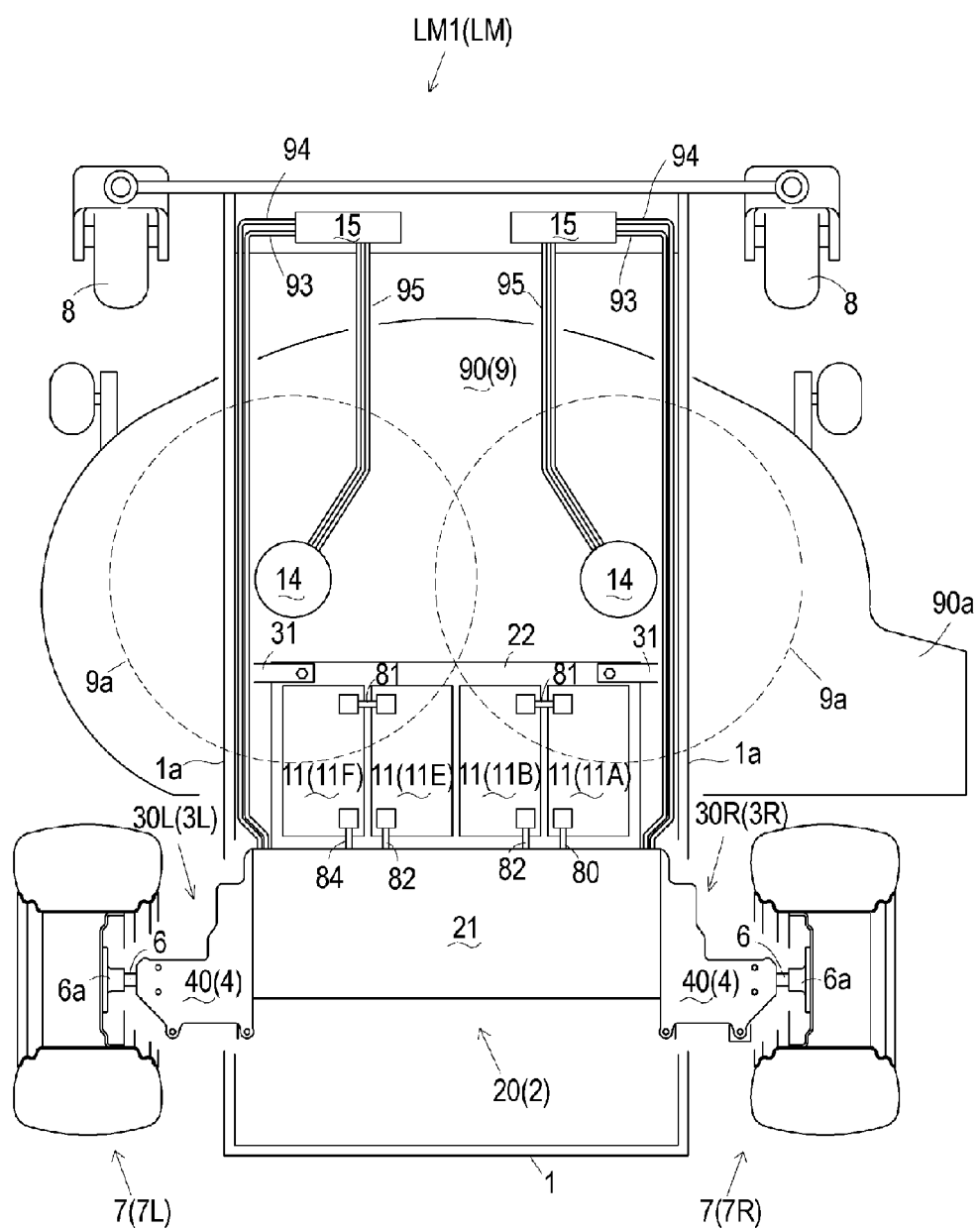
FIG. 1 is a schematic entire plan view of a lawn mower LM1 serving as a first embodiment of an electric lawn mower LM according to the invention, wherein a lawn mower LM1 is provided with a side-discharging mower deck 90 and a sub frame 20 supporting right and left transaxles 30R and 30L rearward from a mower deck 90.
Figure 2:
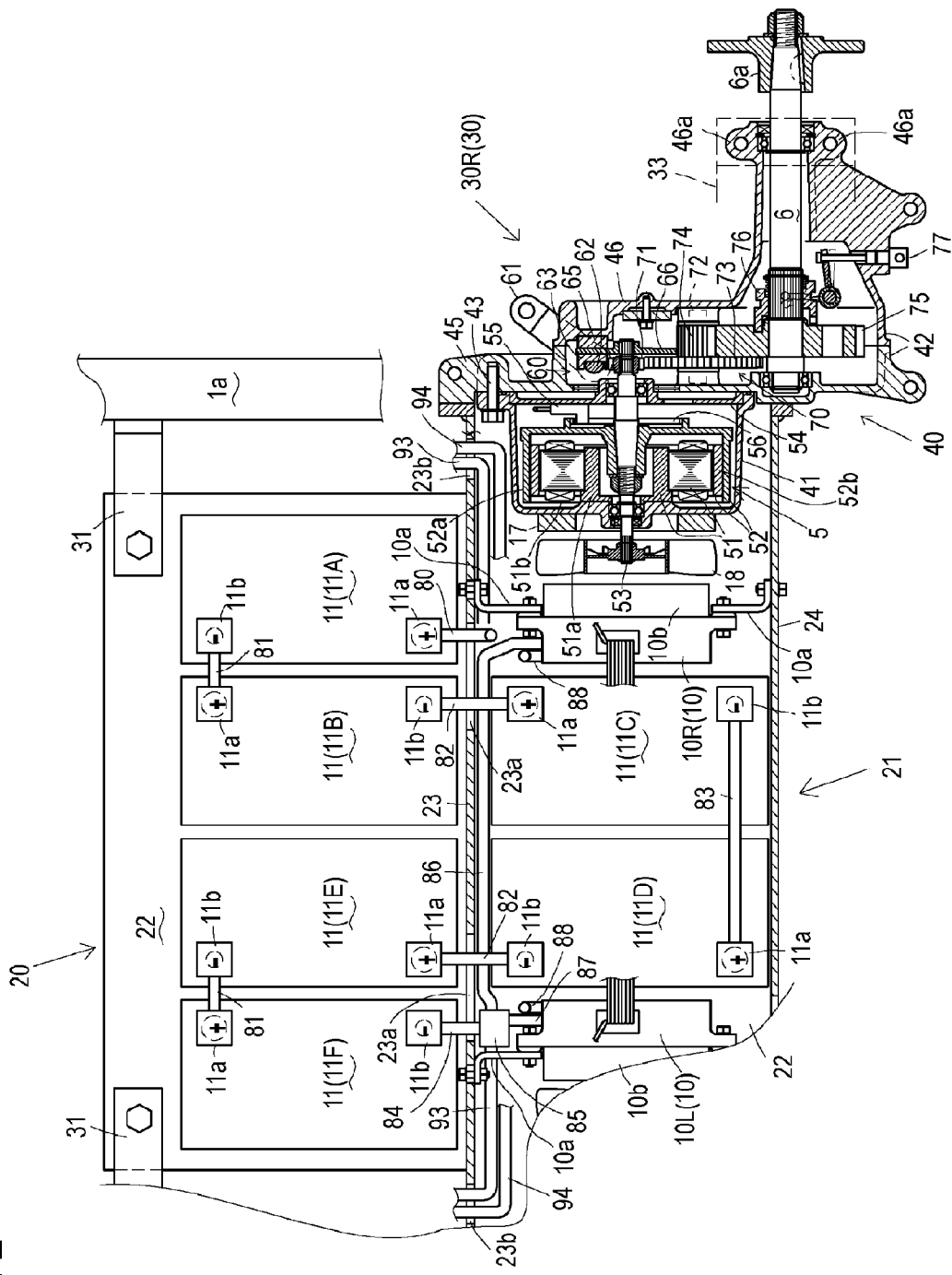
FIG. 2 is a sectional plan view of a principal portion of lawn mower LM1 showing representative right transaxle 30R.
Figure 3:
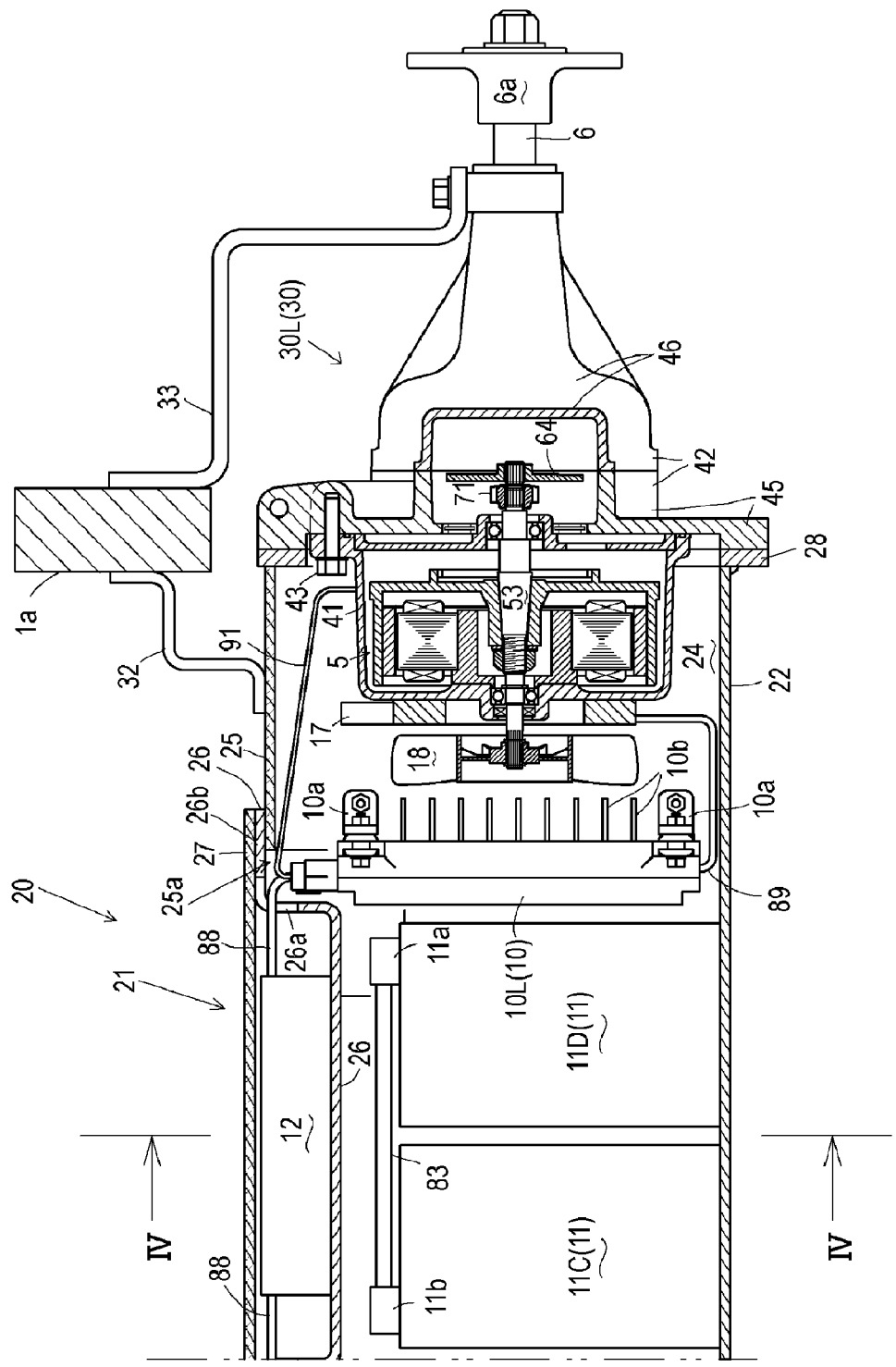
FIG. 3 is a sectional rear view of the principal portion of lawn mower LM1 showing representative right transaxle 30R.
Figure 4:
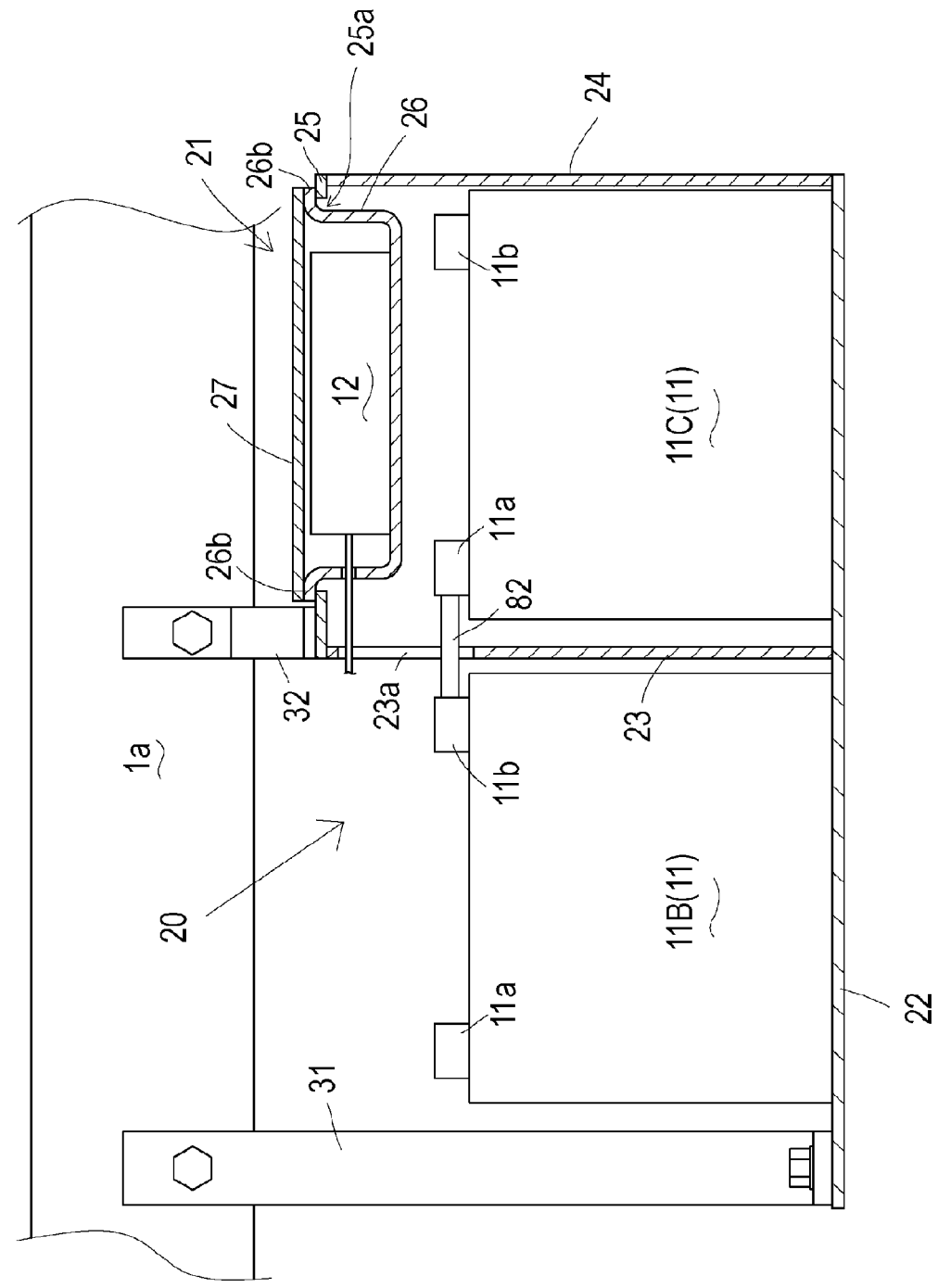
FIG. 4 is a cross-sectional view taken along line IV-IV of FIG. 3.
Figure 5:
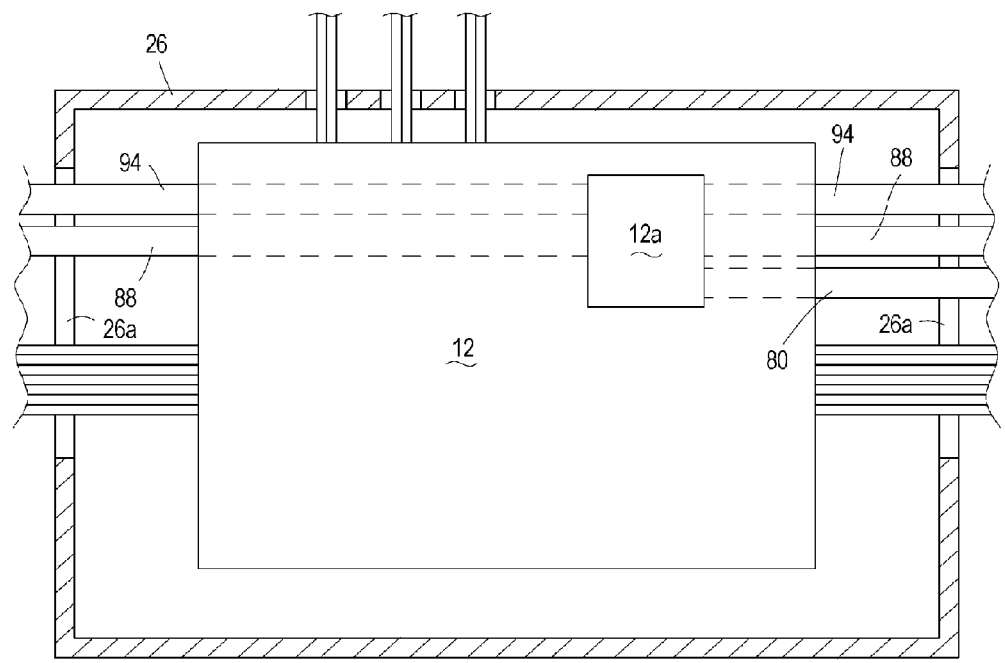
FIG. 5 is a sectional plan view of a controller tray 26 incorporating a controller 12 of lawn mower LM1.
Figure 6:
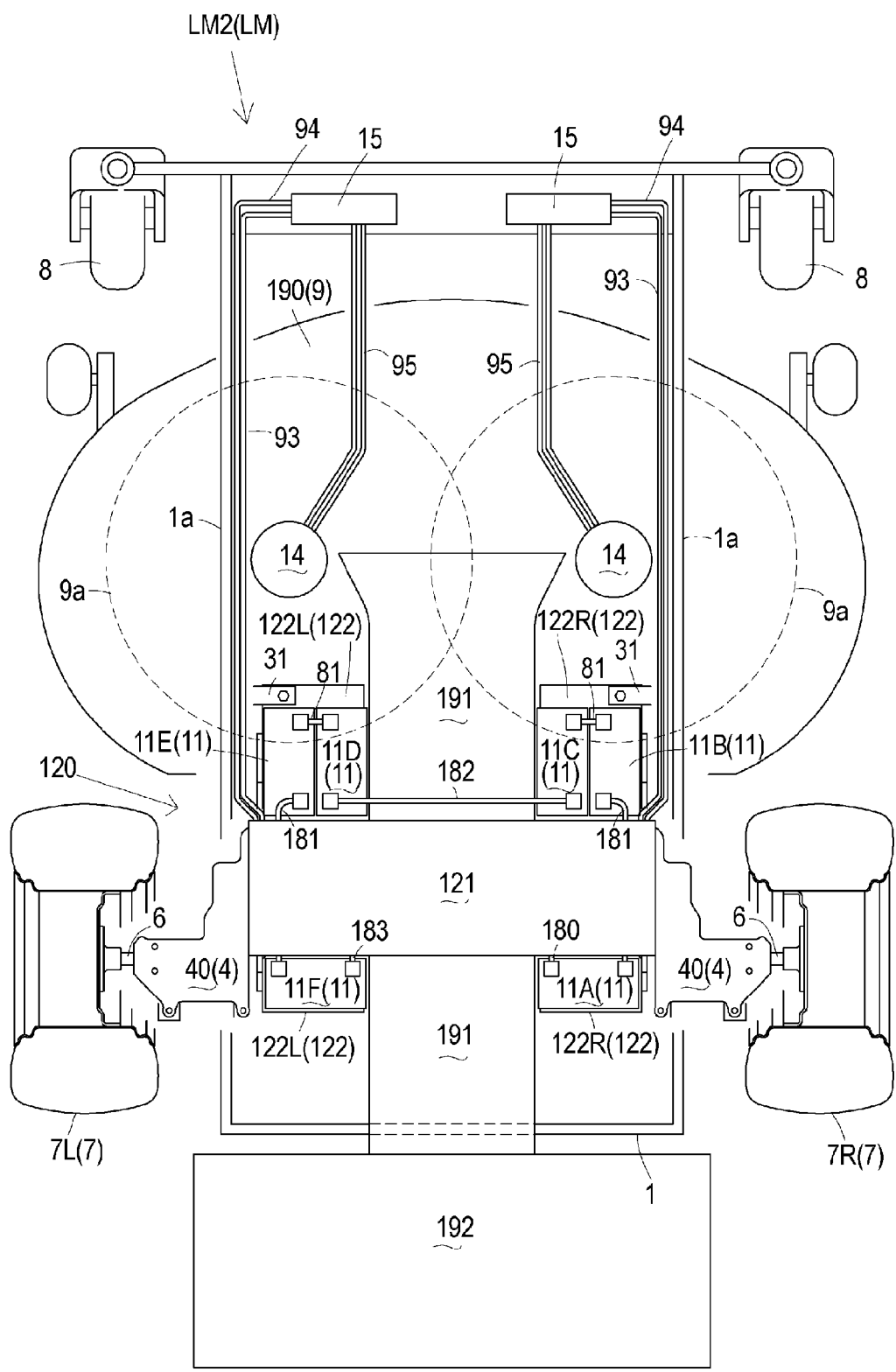
FIG. 6 is a schematic entire plan view of a lawn mower LM2 serving as a second embodiment of electric lawn mower LM, wherein a lawn mower LM2 is provided with a rear-discharging mower deck 190 and a sub frame 120 supporting right and left transaxles 30R and 30L rearward from a mower deck 190.
Figure 7:
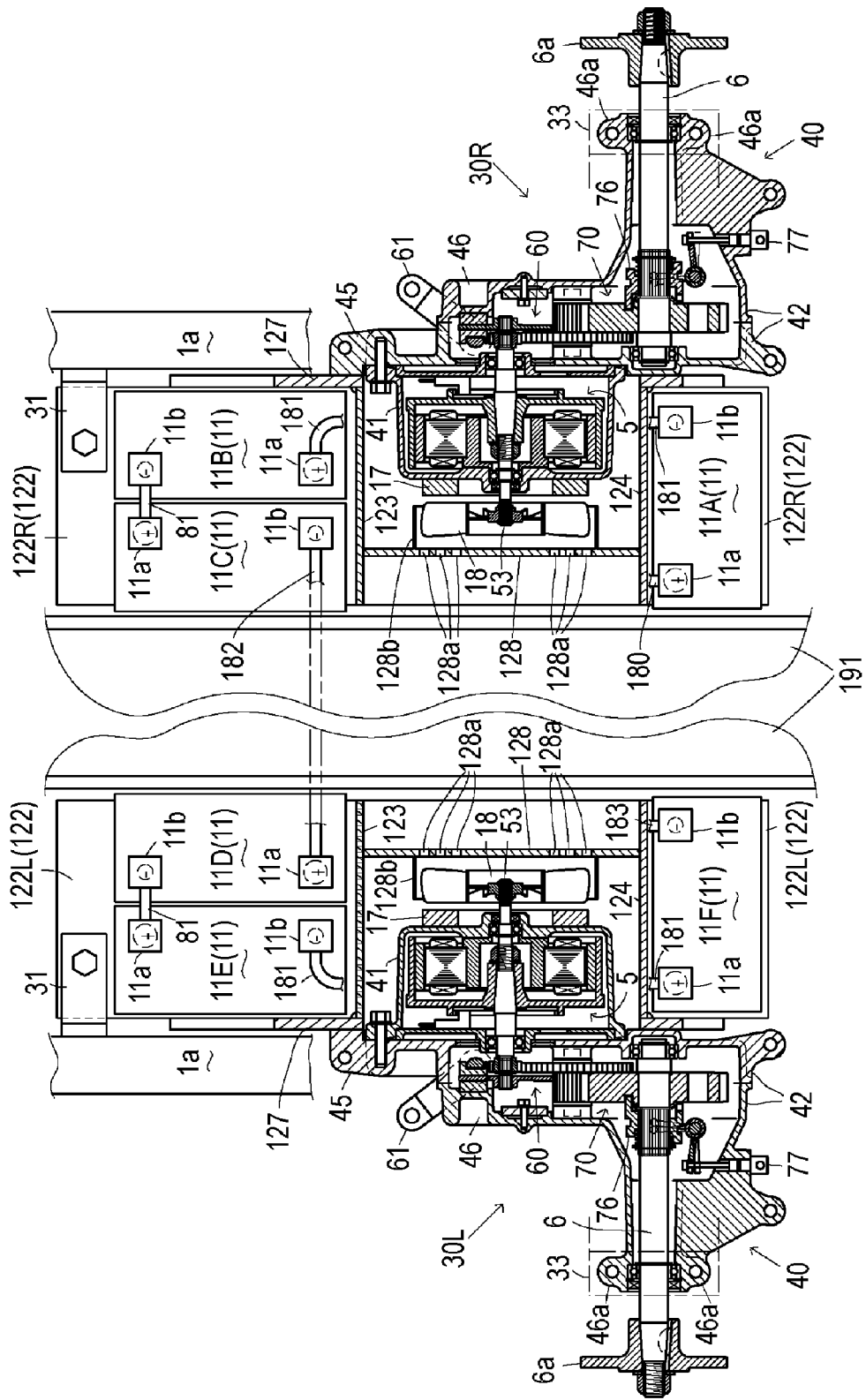
FIG. 7 is a sectional plan view of a principal portion of lawn mower LM2 showing right and left transaxles 30R and 30L.
Figure 8:
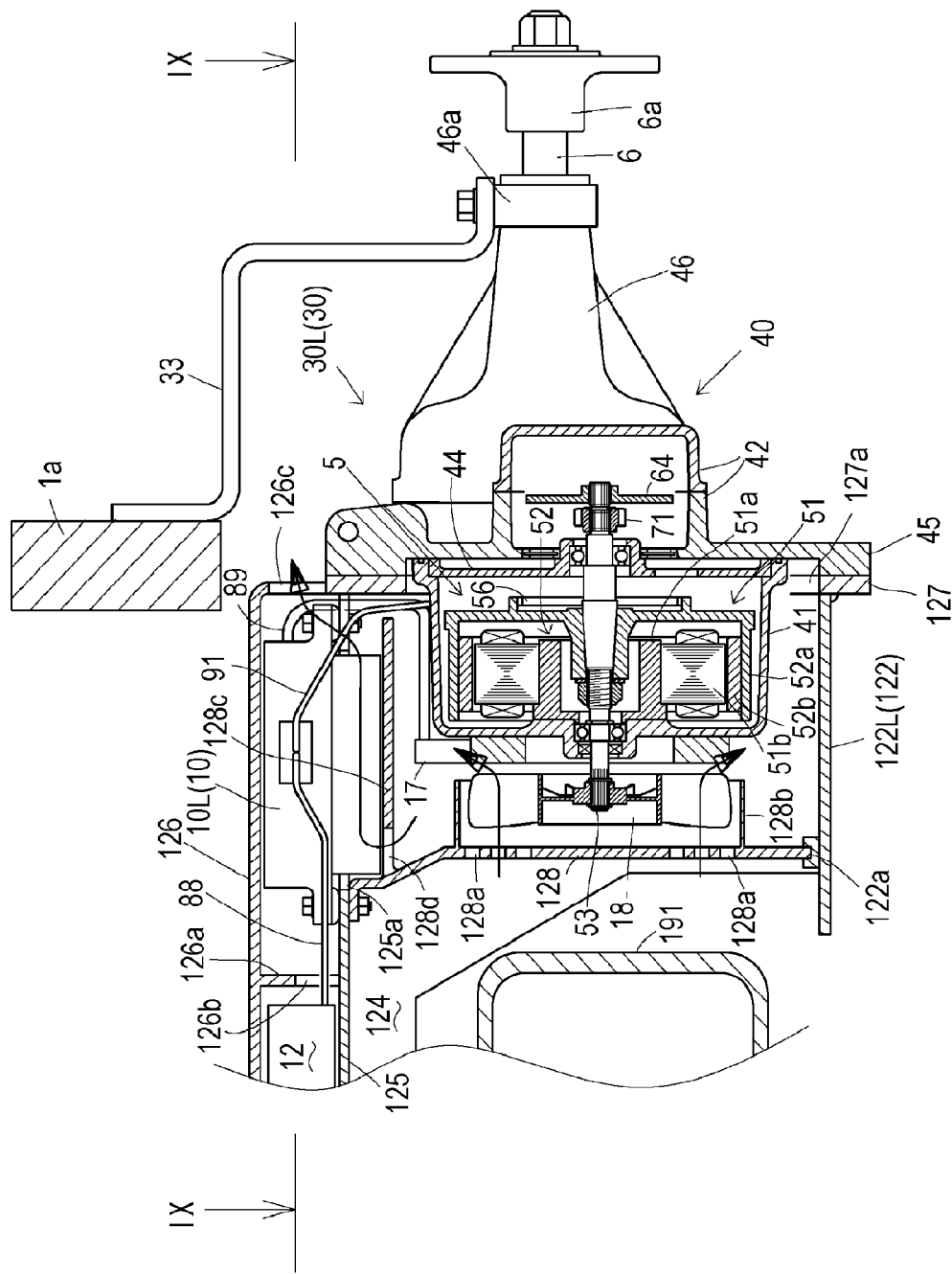
FIG. 8 is a sectional rear view of a principal portion of lawn mower LM2 showing representative right transaxle 30R.
Figure 9:
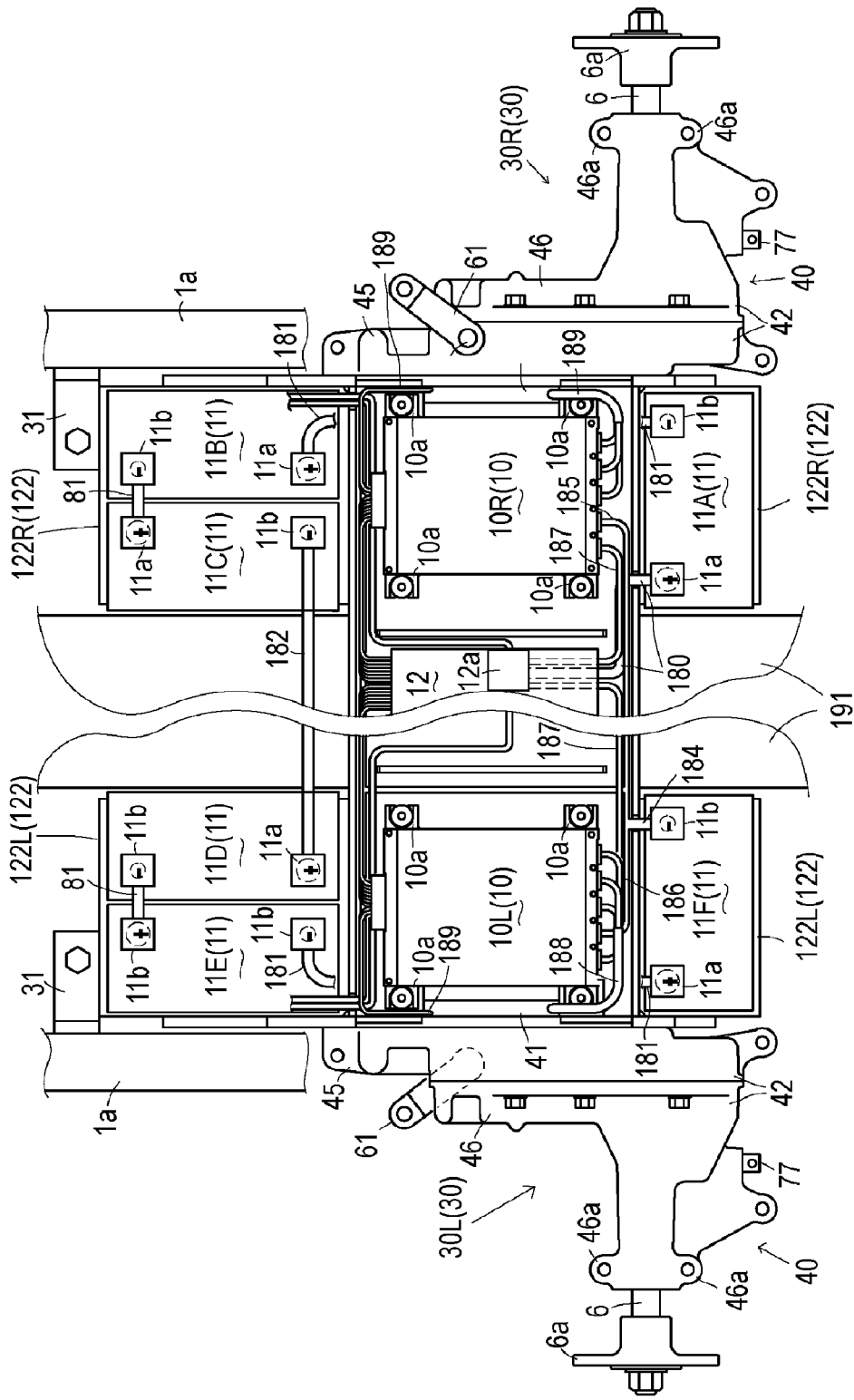
FIG. 9 is a cross-sectional view taken along line IX-IX of FIG. 8.

An electric lawn mower LM is referred to as a generic name for each of electric lawn mowers LM1, LM2 and LM3 disclosed in this application. A general structure of a lawn mower LM will be described with reference to FIGS. 1, 6, 10 and other drawings for describing a common structure shared among lawn mowers LM1, LM2 and LM3.

Lawn mower LM includes a main frame 1 having right and left side portions 1a which are extended in the fore-and-aft direction of lawn mower LM. Main frame 1 supports a mower deck 9 incorporating at least one rotary mowing blade 9 and supports at least one castor 8. Incidentally, dotted circles marked by reference numerals 9a in each of FIGS. 1, 6 and 10 designate rotation loci of mowing blades 9a.

Main frame 1 is assembled with a sub frame 2 so as to constitute a vehicle body of lawn mower LM. Sub frame 2 supports right and left transaxles 3R and 3L (generically named as "transaxles 3") at right and left end portions thereof. Each of transaxles 3 includes a transaxle housing 4, which supports a single axle 6 and incorporates an electric motor 5 for driving axle 6.

Sub frame 2 and right and left transaxles 3R and 3L fixed to sub frame 2 serve as an assembly to be easily and separably connected to main frame 1 of lawn mower LM, thereby improving assembly of lawn mower LM and simplifying manufacturing of lawn mower LM.

Right and left axles 6 supported by transaxle housings 4 of respective right and left transaxles 3R and 3L are extended in the lateral horizontal direction of lawn mower LM and are coaxial. Transaxle housing 4 of right transaxle 3R has a right end on a right outside of right side portion 1a of main frame 1. Right axle 6 projects at an outer axial end thereof rightward from the right end of transaxle housing 4 of right transaxle 3R, a hub 6a is fixed onto the outer axial end of right axle 6, and a right drive wheel 7R is fixed on hub 6a of right axle 6. Transaxle housing 4 of left transaxle 3L has a left end on a left outside of left side plate portion 1a of main frame 1. Left axle 6 projects at an outer axial end thereof leftward from the left end of transaxle housing 4 of left transaxle 3L, a hub 6a is fixed onto the outer axial end of left axle 6, and a left drive wheel 7L is fixed on the outer axial end of left axle 6. In the fore-and-aft direction of lawn mower LM, mower deck 9 is disposed between castor (or castors) 8 and drive wheels 7R and 7L (generically referred to as "drive wheels 7").

Sub frame 2 supports a pair of right and left motor drivers 10R and 10L (generically referred to as "motor drivers 10") for supplying electric power to respective motors 5 of right and left transaxles 3R and 3L. Each motor driver 10 includes a converter for converting DC electric power from a battery or batteries 11 into AC electric power for driving motor 5. Alternatively, each transaxle 3 may incorporate or support corresponding motor driver 10 outside of sub frame 2 (see FIGS. 12-14).

Sub frame 2 supports at least one battery 11 and a controller 12. Sub frame 2, battery (or batteries 11), and controller 12 supported on sub frame 2 are disposed between right and left side portions 1a of main frame 1, i.e., between right and left drive wheels 7R and 7L in the lateral direction of lawn mower LM.

Battery or batteries 11 serve as an electric power source for supplying electric power to motor drivers 10R and 10L, and controller 12 controls electric power supply from battery (or batteries) 11 to motor drivers 10R and 10L. Motor drives 10, battery (or batteries) 11, and controller 12, which occupy a major part of weight of lawn mower LM, are supported by sub frame 2 so as to approach right and left transaxles 3R and 3L supporting respective right and left drive wheels 7R and 7L, thereby appropriately balancing lawn mower LM.

Further, the concentrated arrangement of motor drivers 10, battery (or batteries) 11 and controller 12 on the sub frame 2 is convenient for wiring motor drivers 10, battery (or batteries) 11 and controller 12 with short cables, thereby reducing costs.

Hereinafter, if any element is defined regarding its arrangement in the lateral direction of lawn mower LM (e.g., LM1, LM2 or LM3), it is assumed that a word "proximal" is defined as being directed toward the lateral center of lawn mower LM (between right and left side portions 1a of main frame 1), and a word "distal" is defined as being directed away from the lateral center of lawn mower LM.

Lawn mower LM1 shown in FIGS. 1-5 will be described. Lawn mower LM1 is assumed to have right and left drive wheels 7 as rear wheels and to have a pair of right and left castors 8 as front wheels supported on a front end of a main frame 1. Lawn mower LM1 is equipped with a side-discharging mower deck 90. A duct connection portion 90a, to which a grass-discharging duct (not shown) for discharging mowed grass is connected, is formed on a right or left end portion of mower deck 90 that is disposed on a right or left outside of corresponding right or left side portion 1a of main frame 1. Therefore, motor drives 10, batteries 11 and controller 12 can be supported on sub frame 2 without consideration of location relative to the grass-discharging duct.

A sub frame 20 of lawn mower LM1, serving as sub frame 2 of lawn mower LM, is formed with a main housing 21 and a base plate 22. Main housing 21 is substantially rectangular in side view so as to have four walls enclosing an inner space, i.e., vertical front and rear walls, a horizontal bottom wall and a substantially horizontal top wall. Base plate 22 appears cantilevering horizontally forward from a front bottom end of main housing 21. However, actually, base plate 22 is extended rearward to serve as the horizontal bottom wall of main housing 21. A vertical front plate 23, a vertical rear plate 24 and a substantially horizontal top plate 25 are joined to one another so as to serve as the front, rear and top walls of main housing 21.

Lawn mower LM1 is equipped with right and left transaxles 30R and 30L (generically named as "transaxles 30") serving as right and left transaxles 3R and 3L. Each transaxle 30 includes a transaxle housing 40 serving as transaxle housing 4. Transaxle housing 40 includes a motor housing 41 and a gear housing 42 joined to each other via a vertical joint surface. Motor housing 41 and gear housing 42 are fastened to each other by bolts 43 so as to be separable from each other by loosening bolts 43. Motor housing 41 is disposed on a laterally proximal side of gear housing 42 in lawn mower LM1. In right transaxle 30R, motor housing 41 is extended leftward from gear housing 42. In left transaxle 30L, motor housing 41 is extended rightward from gear housing 42.

Motor housing 41 incorporates electric motor 5. Gear housing 42 incorporates a reduction gear train 70 driven by motor 5 and supports axle 6 driven by reduction gear train 70. An inside housing part 45 and an outside housing part 46 are joined to each other via a vertical joint surface and are fixed to each other by welding or the like so as to form gear housing 42. Axle 6 is extended horizontally in the lateral direction of lawn mower LM1. In gear housing 42, axle 6 is journalled at an axial proximal end thereof by inside housing part 45 via a bearing and is journalled at an axial intermediate portion thereof by outside housing part 46 via a bearing. Axle 6 is extended at an axial distal end thereof laterally outward from gear housing 42 so as to be fixedly provided thereon with hub 6a to be fixed to drive wheel 7.

Motor 5 includes a stator 51, a rotor 52, and a motor shaft 53. Stator 51 includes a horizontal axial cylindrical stator core 51 and armature windings 51b fixed on an outer peripheral surface of stator core 51a. Stator core 51a is fixed at one axial end thereof to a vertical inner wall of motor housing 41. Rotor 52 includes a rotor drum 52a and permanent magnets 52b. Rotor drum 52a is formed with a central boss portion, a vertical plate portion extended radially from central boss portion, and an outer peripheral portion which is extended in the axial direction of motor shaft 53 from the vertical plate portion so as to surround the central boss portion. The central boss portion of rotor drum 52a is fixed onto an axial intermediate portion of motor shaft 53 and is disposed in an inner space of stator core 51a. Permanent magnets 52b are fixed onto an inner peripheral surface of the outer peripheral portion of rotor drum 52a so as to face outer peripheral surfaces of armature windings 51b.

A motor shaft supporter 54 is disposed in motor housing 41, is fixed to motor housing 41, and is extended along a vertical surface of inside housing part 45 of gear housing 42. A rotary speed sensor 55 is fixed onto motor shaft supporter 54. Detected members 56 are fixed onto the vertical plate portion of rotor drum 52a so that rotary speed sensor 55 counts detected members 56 in number or in their rotation degree per unit time so as to detect a rotary speed of rotor 52 and motor shaft 53.

Motor shaft 53 is extended horizontally in the lateral direction of lawn mower LM1 so as to be rotatable integrally with rotor 52. Motor shaft 53 is journalled by motor shaft supporter 54 via a bearing and is extended from an axial distal end thereof laterally outward from motor housing 41 into gear housing 42 via the bearing in motor shaft supporter 54.

Motor housing 41 has a vertical wall disposed laterally opposite to gear housing 42, and the vertical wall of motor housing 41 is defined as a laterally proximal end of transaxle housing 40. A cable-collection box 17 is fixed on an outer surface of this vertical wall of motor housing 41. Motor shaft 53 is journalled via a bearing by said vertical wall of motor housing 41 and is extended from an axial proximal end thereof in main housing 21 of sub frame 20 outward (laterally proximally in lawn mower LM1) from transaxle housing 40 through the vertical wall of motor housing 41 and cable-collection box 17 laterally opposite to gear housing 42. A cooling fan 18 is fixed on the axial proximal end of motor shaft 53 adjacent to cable-collection box 17 so as to preferentially cool cable-collection box 17.

In gear housing 42, a reduction gear train 70 is interposed between the axial distal end portion of motor shaft 53 and axle 6. Reduction gear train 70 includes a motor output gear 71, a diametrically large counter gear 73, a diametrically small counter gear 74, and a final gear 75. Motor output gear 71 is fixed on the axial distal end portion of motor shaft 53. Final gear 75 is provided on axle 6. A counter shaft 72 is extended horizontally in the lateral direction of lawn mower LM1 between motor output shaft 53 and axle 6 and is supported at axial opposite ends thereof by inside and outside housing parts 45 and 46. Counter gears 73 and 74 are supported on counter shaft 72 so as to be rotatable integrally with each other. Counter gear 73 meshes with motor output gear 71, and counter gear 74 meshes with final gear 75.

Gear housing 42 is provided with a brake 60 for braking motor shaft 53. Brake 60 includes a brake arm 61, a brake camshaft 62, a brake shoe 63, a rotary disc 64 and a brake pad 65. Vertical brake camshaft 62 is pivotally supported by inside housing part 45 and is extended at one axial end thereof upwardly or downwardly outward from gear housing 42. Brake arm 61 is fixed on said one axial end of brake camshaft 62 so as to be operatively connected to a brake manipulator on lawn mower LM1 via a mechanical linkage or connected to an actuator for braking. Rotary disc 64 is fixed on the axial distal end of motor shaft 53 adjacent to motor output gear 71. Brake shoe 63 is disposed between brake camshaft 62 and rotary disc 64, and brake pad 65 is disposed between rotary disc 64 and a wall of outside housing part 46 opposite brake shoe 63. When brake arm 61 is set at a braking position, brake camshaft 62 rotates so as to press rotary disc 64 between brake shoe 63 and brake pad 65, thereby braking motor shaft 53.

Final gear 75 is fitted on axle 6 so as to be rotatable relative to axle 6. A clutch 76 is fitted on axle 6 so as to be axially slidable on axle 6, rotatably integral with axle 6, and selectively engageable or disengageable with and from final gear 75. A push-pull pin 77 is fitted in a wall of outside housing part 46 of gear housing 42 and interlocks with clutch 76. Due to operation of push-pull pin 77, when clutch 76 engages with final gear 75, axle 6 is rotatable integrally with final gear 75, i.e., with motor shaft 53, and when clutch 76 disengages from final gear 75, axle 6 is rotatable relative to final gear 75, i.e., freely from motor shaft 53. Normally, clutch 76 is engaged. When lawn mower LM1 has to be towed and axles 6 need to be free from cogging torque of motors 5, push-pull pins 77 of respective right and left transaxles 30R and 30L are operated to disengage respective clutches 76. Incidentally, for convenience, in FIG. 2, a front portion of clutch 76 forward of axle 6 is illustrated as engaging with final gear 75, and a rear portion of clutch 76 rearward of axle 6 is illustrated as disengaging from final gear 75.

Sub frame 20 has flanges 28 fixed on right and left opened ends of main housing 21. To fix transaxle housing 40 of each transaxle 30 to sub frame 20, motor housing 41 is inserted into the inner space of main housing 21 via each of the right and left opened ends of main housing 21, and inside housing part 45 of gear housing 42 is joined to flange 28 on each of the right and left ends of main housing 21. Transaxle 30 fixed to each of the right and left ends of main housing 21 of sub frame 20 is arranged so as to have motor shaft 53 at a front portion thereof and to have axle 6 at a rear portion thereof.

In this regard, upper and lower portions of transaxle housing 40 are symmetric with respect to a surface having axes of motor shaft 53 and axle 6 thereon, and motor 5 and axle 6 are arranged in transaxle housing 40 so that their respective upper and lower portions are symmetric with respect to the surface. Therefore, transaxle 30 can be arranged as either right transaxle 30R or left transaxle 30L, thereby being standardized. With the above assumption that transaxle housing 40 of each transaxle 30 is arranged to have motor shaft 53 forward of axle 6, if transaxle 30 needs to serve as right transaxle 30R, its transaxle housing 40 is arranged to have motor housing 41 leftward of gear housing 42, and if transaxle 30 needs to serve as left transaxle 30L, its transaxle housing 40 is arranged to have motor housing 41 rightward of gear housing 42.

Sub frame 20 and right and left transaxles 30R and 30L fixed on the right and left ends of sub frame 20 are fixed to right and left side portions 1a of main frame 1 of lawn mower LM1 via connection members 31, 32 and 33. A pair of right and left connection members 31 are fastened at respective lower ends thereof to respective right and left front end portions of base plate 22 of sub frame 20 forward of main housing 21 by respective bolts and are fastened at respective upper ends thereof to proximal side surfaces of respective right and left side portions 1a of main frame 1 by respective bolts. A pair of right and left connection members 32 are fastened at respective lower ends thereof to respective right and left end portions of top plate 25 of main housing 21 of sub frame 20 by respective bolts and are fastened at respective upper ends thereof to proximal side surfaces of respective right and left side portions 1a of main frame 1 by respective bolts. A pair of front and rear bosses 46a are formed at a lateral distal end portion of outside housing part 46 of gear housing 42 forward and rearward of axle 6, and each of right and left connection members 33 is fastened at a lower end thereof to front and rear bosses 46a of each of right and left transaxles 30 by bolts and is fastened at an upper portion thereof to a distal side surface of each of right and left side portions 1a of main frame 1 by a bolt or bolts. Either of right and left connection members 31 or right and left connection members 32 may be omitted if they are unnecessary.

Sub frame 20 between right and left transaxles 30R and 30L is disposed between right and left side portions 1a of main frame 1. Base plate 22 of sub frame 20 is disposed at a front portion thereof above a rear end portion of mower deck 90. Drive wheels 7 serving as rear wheels of lawn mower LM1 are fixed on axles 6 supported by the rear portions of transaxle housings 40 of right and left transaxles 30 so that front ends of drive wheels 7 are disposed immediately rearward of right and left rear end portions of mower deck 90. As a result, motor drivers 10, batteries 11 and controller 12 supported on sub frame 20 are disposed between right and left transaxles 30R and 30L and mower deck 90 so as to optimize a weight balance of lawn mower LM1 between drive wheels 7 and castors 8. For example, a ratio of a part of weight of lawn mower LM1 applied to drive wheels 7 to a part of weight of lawn mower LM1 applied to castors 8 is 7:3.

In this embodiment, six batteries 11, consisting of first to sixth batteries 11A, 11B, 11C, 11D, 11E and 11F, are supported on sub frame 20 so as to be electrically connected in series one to another so as to flow current in order from first battery 11A to sixth battery 11F through second to fifth batteries 11B, 11C, 11D and 11E. First battery 11A, second battery 11B, fifth battery 11E and sixth battery 11F are aligned in the lateral direction of lawn mower LM1 and are mounted upright on base plate 22 forward of main housing 21. Third battery 11C and fourth battery 11D are aligned in the lateral direction of lawn mower LM1 and mounted upright on base plate 22 inside of main housing 21. Second and third batteries 11B and 11C are aligned in the fore-and-aft direction of lawn mower LM1, and fourth and fifth batteries 11D and 11E are aligned in the fore-and-aft direction of lawn mower LM1 so that third and fourth batteries 11C and 11D are partitioned from second and fifth batteries 11B and 11E by a vertical front plate 23 of main housing 21.

Each battery 11 has a positive battery post 11a and a negative battery post 11b. Positive battery post 11a of each battery 11, excluding first battery 11A, is connected to negative battery post 11b of another battery 11 via any of cables 81, 82 and 83 so that said six batteries 11A, 11B, 11C, 11D, 11E and 11F are electrically connected in series. Positive battery post 11a of first battery 11A is connected to a later-discussed contactor 12a of controller 12 via a cable 80. Controller 12 is disposed in main housing 21, and cable 80 is passed through one of right and left holes 23a (in this embodiment, right hole 23a) formed in front plate 23 of main housing 21 so as to be connected to contactor 12a. Negative battery post 11b of sixth battery 11F is connected via a cable 84 to a distributor 85 from which cables 86 and 87 are extended to respective right and left motor drivers 10R and 10L. Distributor 85 is disposed in main housing 21, and a cable 84 is passed through the other of right and left holes 23a (in this embodiment, left hole 23a) formed in front plate 23 of main housing 21 so as to be connected to distributor 85.

All six batteries 11 serving as batteries 11A, 11B, 11C, 11D, 11E and 11F are identical to each other. Each pair of neighboring right and left batteries 11 are arranged so that one battery 11 corresponds to the other battery 11 having been rotated horizontally 180 degrees. Negative battery post 11b of first battery 11A and positive battery post 11a of second battery 11B adjoin each other and are connected to each other via one lateral cable 81 which can be very short. Negative battery post 11b of fifth battery 11E and positive battery post 11a of sixth battery 11F adjoin each other and are connected to each other via other lateral cable 81 which can also be very short. Negative battery post 11b of second battery 11B and positive battery post 11a of third battery 11C approach each other while having front plate 23 of main housing 21 therebetween and are connected to each other via one fore-and-aft cable 82 which can be short and is passed through one of right and left holes 23a (in this embodiment, right hole 23a). Negative battery post 11b of fourth battery 11D and positive battery 11a of fifth battery 11E approach each other while having front plate 23 of main housing 21 therebetween and are connected to each other via other fore-and-aft cable 82 which can also be short and is passed through the other of right and left holes 23a (in this embodiment, left hole 23a). Negative battery post 11b of third battery 11C and positive battery post 11a of fourth battery 11D are distant from each other and are connected to each other via long lateral cable 83.

A hole 25a, which is rectangular when viewed in plan, is opened in top plate 25 of main housing 21 above third and fourth batteries 11C and 11D. Controller 12 is fixed in a controller tray 26, and controller tray 26 is disposed in the inner space of main housing 21 just above third and fourth batteries 11C and 11D. Controller tray 26 has a horizontal top opening and has a horizontal bottom surface. Controller 12 in controller tray 26 is fixed on the bottom surface of controller tray 26 so as to have a top surface which is substantially leveled with the top opening of controller tray 26. Controller tray 26 is formed with a horizontal top flange 26b surrounding the top opening of controller tray 26. Top flange 26b is disposed just above hole 25 and is fixed onto top plate 25 of main housing 21 surrounding hole 25a. A cover plate 27 is placed at its surrounding edge on top flange 26b of controller tray 26 so as to cover the top surface of controller 12 in controller tray 26 and is fixed to flange 26b of controller tray 26.

Controller tray 26 has a pair of right and left holes 26a in respective right and left vertical walls thereof. Cable 80 extended from positive battery base 11a of first battery 11A is passed through one of right and left holes 26a and is connected to contactor 12a of controller 12. A pair of right and left cables 88 are extended from contactor 12a so that right cable 88 is extended rightward from contactor 12a and is passed through right hole 26a so as to be connected to right motor driver 10R, and left driver cable 88 is extended from contactor 12a and is passed through left hole 26a so as to be connected to left motor driver 10L.

Right motor driver 1 OR is disposed in the inner space of main housing 21 of sub frame 20 on a right side of one of third or fourth batteries 11C and 11D (in this embodiment, third battery 11C) adjacent to cooling fan 18 of right transaxle 30R. Left motor driver 10L is disposed in the inner space of main housing 21 of sub frame 20 on a left side of one of third or fourth battery 11C and 11D (in this embodiment, fourth battery 11D) adjacent to cooling fan 18 of left transaxle 30L. Each motor driver 10 is fixedly provided with upper and lower tabs 10a on front and rear vertical edges thereof and is fixed at the front and rear vertical edges to vertical front and rear plates 23 and 24 of main housing 21 via tabs 10a by screwing bolts, respectively. Each motor driver 10 is formed with fins 10b at a portion facing corresponding cooling fan 18, thereby being efficiently cooled by cooling fan 18.

Cables 86 and 87 are extended from distributor 85 and are connected to respective right and left motor drivers 10R and 10L. In this embodiment, since distributor 85 is disposed immediately forward of left motor driver 10L, cable 87 connected to left motor driver 10L is so short as to be extended straightly rearward from distributor 85 to left motor driver 10L. Cable 86 connected to right motor driver 10R is extended rightward from distributor 85 and through a gap between front plate 23 of main housing 21 of sub frame 20 and front ends of third and fourth batteries 11C and 11D.

A cable 89 is extended from each motor driver 10 and is connected to cable-collection box 17 of corresponding transaxle 30. Since each motor driver 10 approaches corresponding cooling fan 18 adjacent to corresponding cable-collection box 17, cable 89 connected to cable-collection box 17 can be short so as to improve efficiency of transmitting electric power. Further, a cable 91 is extended from each motor driver 10 and is connected to rotary speed sensor 55 of corresponding transaxle 30.

Mower deck 90 of lawn mower LM1 is equipped thereon with a pair of right and left electric mower motors 14 for driving respective right and left rotary blades 9a in mower deck 90. A pair of right and left mower motor drivers 15 are fixed on the front end portion of main frame 1 and are electrically connected to respective right and left mower motors 14 via respective cables 95, to distributor 85 via respective right and left cables 93, and to contactor 12a of controller 12 via respective right and left cables 94. In this regard, a pair of right and left holes 23b are formed in front plate 23 of main housing 21 of sub frame 20 so as to have the pair of right and left holes 23a therebetween. Right cable 93 extended rightward from distributor 85 and right cable 94 extended rightward from contactor 12a are passed through right hole 23 band are extended along right side portion 1a of main frame 1 so as to be connected to right mower motor driver 15. Left cable 93 extended leftward from distributor 85 and left cable 94 extended leftward from contactor 12a are passed through left hole 23 band are extended along right side portion 1a of main frame 1 so as to be connected to left mower motor driver 15.

Lawn mower LM2 shown in FIGS. 6-9 will be described. Lawn mower LM2 is defined to have right and left drive wheels 7R and 7L as rear wheels and to have a pair of right and left castors 8 as front wheels supported on a front end of main frame 1. Right and left transaxles 30R and 30L serve as right and left transaxles 3R and 3L of lawn mower LM2 similar to those of lawn mower LM1. Lawn mower LM2 is equipped with a rear-discharging mower deck 190. In this regard, a grass tank 192 is provided rearward of rear end of main frame 1, and a grass-discharging duct 191 is extended rearward from a laterally central rear end of mower deck 190 to grass tank 192. Grass-discharging duct 191 is extended in the fore-and-aft direction of lawn mower LM2 at a laterally central portion of lawn mower LM2 between right and left side portions 1a of main frame 1 and between right and left transaxles 30R and 30L. Therefore, a sub frame 120 of lawn mower LM2, serving as sub frame 2 supporting motor drives 10, batteries 11 and controller 12, is formed so that motor drivers 10, batteries 11 and controller 12 supported on sub frame 120 are disposed between right and left side portions 1a of main frame 1 so as to be prevented from interfering with grass-discharging duct 191 and motor housings 41 of right and left transaxles 30R and 30L.

Sub frame 120 includes a main housing 121, which is extended in the lateral direction of lawn mower LM2 so as to stride grass-discharging duct 191 and includes a pair of right and left base plates 122R and 122L (generically referred to as "base plates 122") extended forward and rearward from main housing 121. Main housing 121 includes vertical front and rear plates 123 and 124, a horizontal upper plate 125, a top cover 126 and right and left flanges 127. Front and rear plates 123 and 124 serve as front and rear end walls of main housing 121 and are shaped as a gate or arch when viewed from front so that each of front and rear plates 123 and 124 has a horizontal top end extended between right and left ends of main housing 121, has a laterally central bottom end above grass-discharging duct 191, and has right and left bottom ends which are lower than the laterally central bottom end and are disposed on right and left opposite right sides disposed on right and left outsides of grass-discharging duct 191. Front and rear plates 123 and 124 are fixed at the respective right and left bottom ends thereof to respective right and left base plates 122R and 122L so that base plates 122R and 122L also serve as horizontal right and left bottom walls of main housing 121.

Top plate 125 serves as a top end wall of main housing 121 and is joined at front and rear ends thereof to top ends of respective front and rear plates 123 and 124. Controller 12 is fixed on a lateral center portion of upper plate 125 just above grass-discharging duct 191, right motor driver 10R is fixed on a right portion of upper plate 125 rightward of controller 12, and left motor driver 10L is fixed on a left portion of upper plate 125 leftward of controller 12.

Top cover 126 is disposed above upper plate 125 of main housing 121 of sub frame 120 so as to cover top surfaces of controller 12 and right and left motor drivers 10R and 10L. Top cover 126 is formed with a horizontal flat portion above controller 12 and right and left motor drivers 10R and 10L and is formed with vertical front, rear, right and left end wall portions extended downward from front, rear, right and left ends of the horizontal flat portion so as to be fixed to upper plate 125. Further, top cover 126 is formed with a pair of right and left vertical partition portions 126a extended downward from the horizontal flat portion so that right partition portion 126a of top cover 126 is disposed between right motor driver 10R and a right end of controller 12 and that left partition portion 126a of top cover 126 is disposed between left motor driver 10L and left end of controller 12. In other words, controller 12 is disposed in a lateral central inside space of main housing 121 of sub frame 120 between right and left partition portions 126a above grass-discharging duct 191. Right motor driver 10R is disposed in a right upper inside space of main housing 121 between right partition portion 126a and the right end wall of top cover 126. Left motor driver 10L is disposed in a left upper inside space of main housing 121 between left partition portion 126a and the left end wall of top cover 126.

Right and left base plates 122R and 122L are extended at respective front portions thereof horizontally forward from the respective right and left bottom ends of front plate 123 along respective right and left end surfaces of grass-discharging duct 191 so as to support batteries 11 thereon. Right and left base plates 122R and 122L are also extended at respective rear portions thereof horizontally rearward from the respective right and left bottom ends of rear plate 124 along respective right and left end surfaces of grass-discharging duct 191 so as to support batteries 11 thereon. In this embodiment, a pair of right and left batteries 11 are supported on the front portion of each of right and left base plates 122R and 122L and a single battery 11 is supported on the rear portion of each of right and left base plates 122R and 122L so that lawn mower LM2 is provided with six batteries 11 supported on sub frame 120.

Vertical flange 127 is fixed on each of right and left ends of main housing 121 of sub frame 120 so as to surround an opening 127a defined by each of right and left ends of front, rear and top plates 123, 124 and 125.

Right base plate 122R, opening 127a in right flange 127, and the right portions of front, rear and top plates 123, 124 and 125 define a right lower inside space of main housing 121 on the right outside of grass-discharging duct 191 and below the right upper inside space of main housing 1221 incorporating right motor driver 10R so as to surround motor housing 41 of transaxle housing 40 of right transaxle 30R. Left base plate 122L, opening 127a in left flange 127, and the left portions of front, rear and top plates 123, 124 and 125 define a left lower inside space of main housing 121 on the left outside of grass-discharging duct 191 and below the left upper inside space of main housing 121 incorporating left motor driver 10L so as to surround motor housing 41 of transaxle housing 40 of left transaxle 30L.

Gear housing 42 of transaxle housing 40 of each of right and left transaxles 30R and 30L is fixed to an outer surface of each flange 127 so that motor housing 41 fixed to gear housing 42 is inserted through each opening 127a into each of said right and left lower inside spaces of main housing 121 on the right and left outsides of grass-discharging duct 191.

A pair of right and left plastic partitions 128, made of synthetic resin or the like, are extended substantially vertically and in the fore-and-aft direction of lawn mower LM2 and are disposed on the right and left outsides of grass-discharging duct 191 so that each partition 128 is disposed to define a lateral proximal end of each of said right and left lower inside spaces of main housing 121 adjacent to cooling fan 18 projecting from motor housing 41. Each partition 128 is fixed at a top portion thereof to upper plate 125 of main housing 121 of sub frame 120 by bolts or the like and is plastically fitted at a bottom end thereof into a groove 122a, which is formed on each of base plates 122R and 122L so as to extend in the fore-and-aft direction of lawn mower LM2. Each partition 128 is tightly fitted at front and rear ends thereof to front and rear plates 123 and 124. Therefore, right partition 128 defines a left end of the right lower inside space of main housing 121 incorporating motor housing 41 of right transaxle 30R so as to partition the right lower inside space of main housing 121 from an outer space surrounding grass-discharging duct 191, and left partition 128 defines a right end of the left lower inside space of main housing 121 incorporating motor housing 41 of left transaxle 30L so as to partition the left lower inside space of main housing 121 from the outer space surrounding grass-discharging duct 191.

Each partition 128 is formed with holes 128a in a vertical portion thereof facing corresponding cooling fan 18 and is formed with a cylindrical shroud 128b extended from said vertical portion thereof so as to surround cooling fan 18. Therefore, cooling fan 18 introduces air through holes 128a from the outer space surrounding grass-discharging duct 191 into each of the right and left lower inside spaces of main housing 121 incorporating each motor housing 41, shroud 128b guides the air to cooling fan 18, and cooling fan 18 blows the air to cable-collection box 17 on motor housing 41.

Each of right and left motor drivers 10R and 10L is formed with fins 10b extended downward therefrom. Each of said right and left portions of upper plate 125 is formed with an opening 125a through which fins 10b are extended downward into each of the right and left inside spaces of main housing 121 incorporating motor housings 41 of respective transaxles 30R and 30L. Each partition 128 is formed with a horizontal plate portion 128c disposed immediately below bottom ends of fins 10b of each of motor drivers 10R and 10L. Horizontal plate portion 128c is formed with a vent 128d adjacent to the vertical portion of partition 128 so that the air blown by cooling fan 18 below horizontal plate portion 128c is guided upward via vent 128d and is blown to fins 19b of each motor driver 10 above horizontal plate portion 128c. Further, the air is introduced through opening 125a into each of said right and left upper inside spaces of main housing 121 incorporating each motor driver 10. Top cover 126 is formed with right and left vents 126a in respective right and left end walls thereof so that the air is exhausted via each vent 126c from each of the right and left upper inside spaces of main housing 121 to the outside space of sub frame 120. Arrows in FIG. 8 designate flow of the air from holes 128a to vent 126c.

Horizontal plate portion 128c of each partition 128 and corresponding flange 127 have a gap therebetween. Cables 88 and 91 are extended through this gap and opening 125a of upper plate 125 from each motor driver 10 to corresponding cable-collection box 17 and to rotary speed sensor 55 below motor driver 10, respectively. top cover 126 is formed in right and left partition portions 126a with respective holes 126b through which right and left cables 88 are extended from contactor 12a of controller 12 to respective right and left motor drivers 10R and 10L.

Lawn mower LM2 is provided with six batteries 11, i.e., first to sixth batteries 11A, 11B, 11C, 11D, 11E and 11F, electrically connected to one another in series, similar to those of lawn mower LM1. Battery 11 on the rear portion of one of right and left base plates 122R and 122L (in this embodiment, right base plate 122R) serves as first battery 11A and has positive battery post 11a from which a cable 180 is extended to contactor 12a of controller 12. Battery 11 on the rear portion of the other of right and left base plates 122R and 122L (in this embodiment, left base plate 122L) serves as sixth battery 11F and has negative battery post 11b from which a cable 183 is extended and is bifurcated into a right cable 134 connected to right motor driver 10R and a left cable 135 connected to left motor driver 10L.

Right and left batteries on the front portion of one of right and left base plates 122R and 122L (in this embodiment, right base plate 122R), whose rear portion supports first battery 11A thereon, serve as second and third batteries 11B and 11C, which are arranged so that negative battery post 11b of second battery 11B and positive battery post 11a of third battery 11C adjoin each other and are connected to each other via lateral cable 81. Right and left batteries on the front portion of the other of right and left base plates 122R and 122L (in this embodiment, left base plate 122L), whose rear portion supports sixth battery 11F thereon, serve as fourth and fifth batteries 11D and 11E, which are arranged so that negative battery post 11b of fourth battery 11D and positive battery post 11a of fifth battery 11E adjoin each other and are connected to each other via lateral cable 81.

Negative battery post 11b of first battery 11A rearward of main housing 121 is connected to positive battery post 11a of second battery 11B forward of main housing 121 via a cable 181 which is extended in the fore-and-aft direction of lawn mower LM2 across the right lower inside space of main housing 121 incorporating motor housing 41 of right transaxle 30R, i.e., through the right upper inside space of main housing 121 incorporating right motor driver 10R. Positive battery post 11a of sixth battery 11F rearward of main housing 121 is connected to negative battery post 11b of fifth battery 11E forward of main housing 121 via a cable 181 which is extended in the fore-and-aft direction of lawn mower LM2 across the left lower inside space of main housing 121 incorporating motor housing 41 of left transaxle 30L, i.e., through the left upper inside space of main housing 121 incorporating left motor driver 10L. Negative battery post 11b of third battery 11C rightward of grass-discharging duct 191 is connected to positive battery post 11a of fourth battery 11D leftward of grass-discharging duct 191 via a cable 182 which is extended in the lateral direction of lawn mower LM2 across grass-discharging duct 191.

Sub frame 120 is fixed to main frame 1 by connecting the front portions of respective right and left base plates 122R and 122L extended forward from main housing 121 to respective right and left side portions 1a of main frame 1 via respective connection members 33. In addition to connection members 33, or alternatively, connection members 32 (see FIG. 4) may be provided to connect respective right and left end portions of top cover 126 to respective right and left side portions 1a of main frame 1 so as to fix sub frame 120 to main frame 1. Right and left transaxles 30R and 30L are fixed to main frame 1 by connecting bosses 46a of respective transaxle housings 40 to respective right and left side portions 1a of main frame 1 via respective connection members 33.

Figure 10:
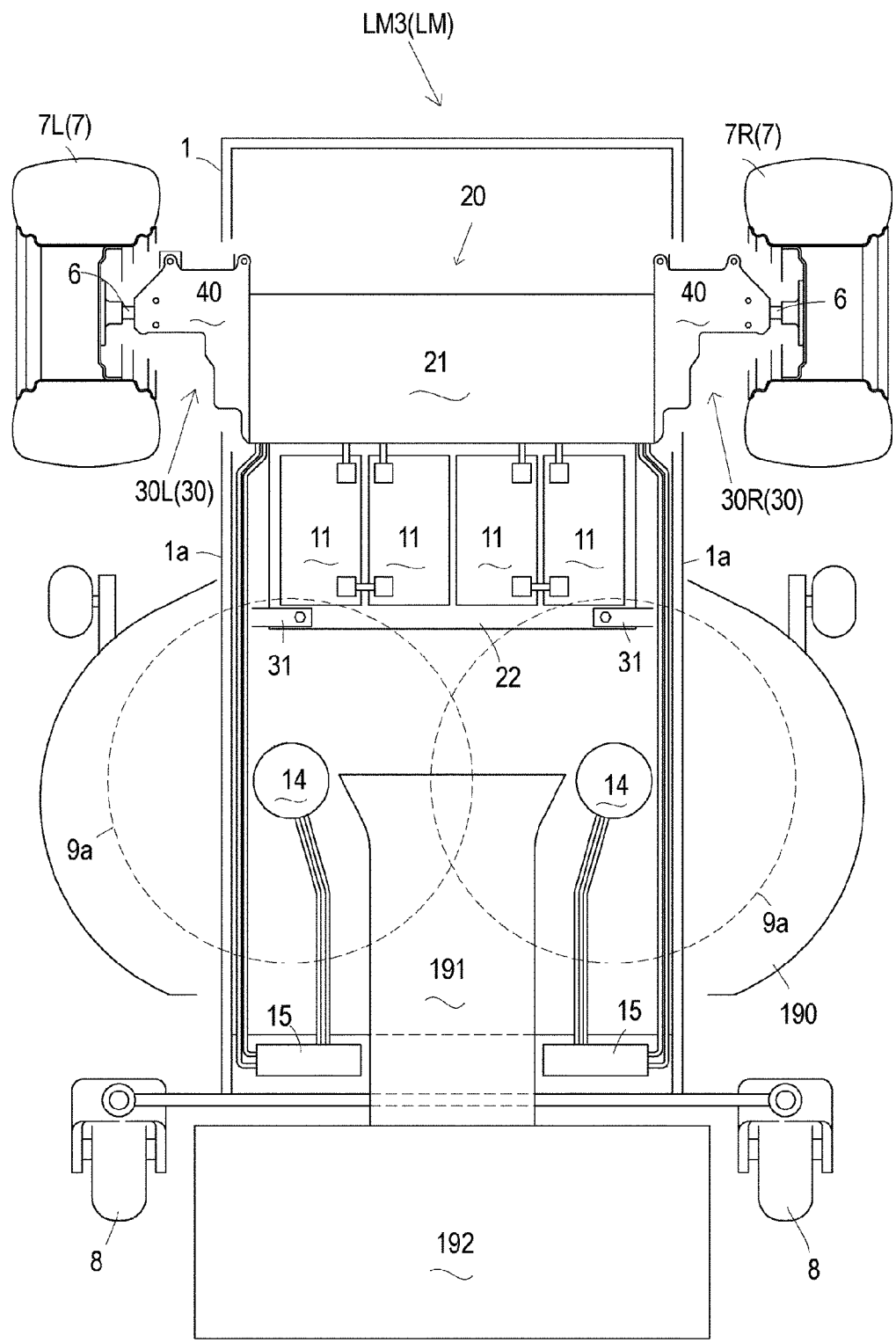
FIG. 10 is a schematic entire plan view of a lawn mower LM3 serving as a third embodiment of electric lawn mower LM, wherein a lawn mower LM3 is provided with a rear-discharging mower deck 190 and a sub frame 20 supporting right and left transaxles 30R and 30L forward from a mower deck 190.

Lawn mower LM3 shown in FIG. 10 will be described. Lawn mower LM3 is equipped with rear-discharging mower deck 190, and is equipped with grass tank 192 rearward of the rear end of main frame 1. Grass-discharging duct 191 is extended rearward from the laterally central rear end of mower deck 190 to grass tank 192 between right and left side portions 1a of main frame 1. Right and left castors 8 are supported at the rear end portion of main frame 1 so as to serve as rear wheels of lawn mower LM3.

In lawn mower LM3, sub frame 2 supporting right and left transaxles 3R and 3L is disposed forward of mower deck 190 so that drive wheels 7 supported by respective right and left transaxles 3 serve as front wheels of lawn mower LM3. Sub frame 2 does not have to be configured in consideration of avoiding interference with grass-discharging duct 191. Therefore, sub frame 20, supporting right and left transaxles 30R and 30L, serves as sub frame 2 of lawn mower LM3, similar to that of lawn mower LM1. The description adapted for lawn mower LM1 is also adapted as description of lawn mower LM3 regarding arrangement of motor drivers 10R and 10L, batteries 11, controller 12 and right and left transaxles 30R and 30L in/on sub frame 20 and regarding attachment of sub frame 20 with right and left transaxles 30R and 30L to main frame 1.

Each of lawn mowers LM1, LM2 and LM3 has been described with the assumption that its right and left transaxles 3R and 3L are transaxles 30 which include transaxle housing 40 arranged so as to have motor housing 41 disposed on the lateral proximal side of gear housing 42, i.e., to have motor 5 disposed on the lateral proximal side of reduction gear train 70. Alternatively, a transaxle 130 shown in FIG. 11, for example, having motor 5 disposed on the lateral distal side of reduction gear train 70, may serve as each of right and left transaxles 3R and 3L of lawn mower LM.

Figure 11:
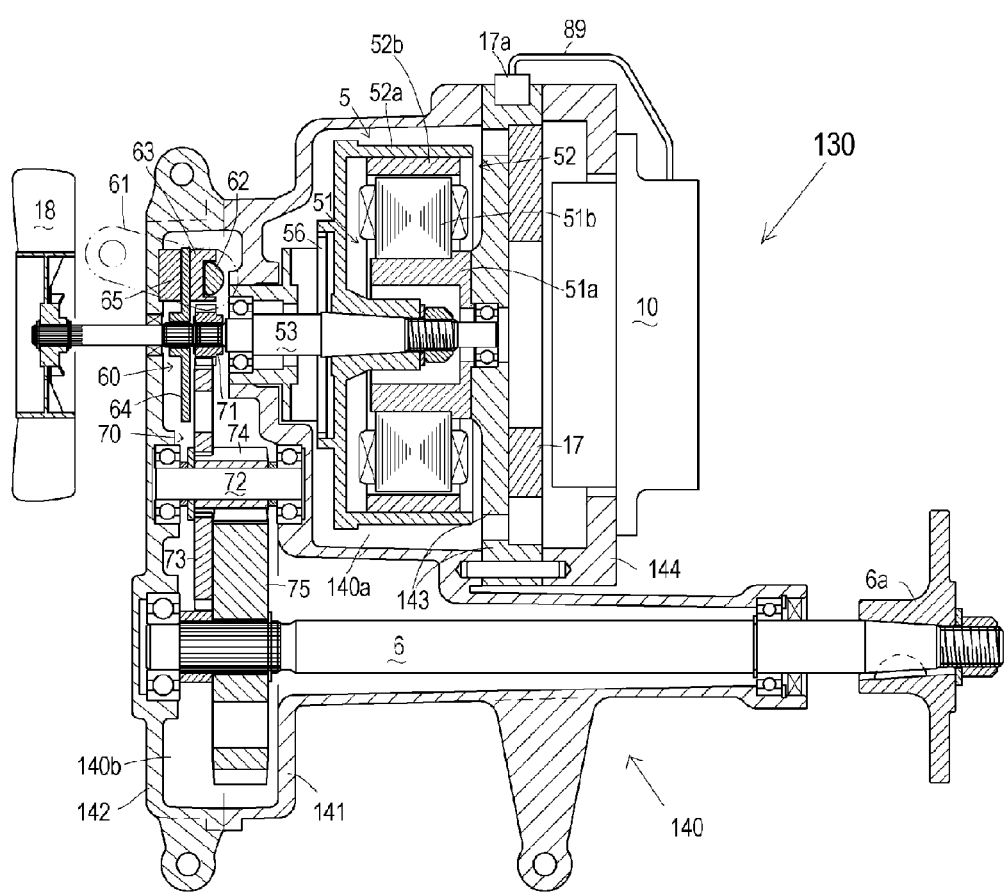
FIG. 11 is a sectional plan view of an alternative transaxle 130.

Transaxle 130 shown in FIG. 11 includes a transaxle housing 140 which is formed by joining an inside housing 141 and an outside housing 142 to each other through a vertical joint surface so that outside housing 142 is disposed on the distal side of inside housing 141 in the lateral direction of lawn mower LM3. It is assumed that motor shaft 53, counter shaft 72, and axle 6 are extended horizontally in the lateral direction of lawn mower LM3 and that motor shaft 53 is disposed forward of axle 6. Inside and outside housings 141 and 142 joined to each other are formed therein with a gear chamber 140b which is substantially L-shaped in plan view. Gear chamber 140b has a fore-and-aft chamber portion extended in the fore-and-aft direction of lawn mower LM3 along inside housing 141 and has an axle chamber portion extended in the lateral direction of lawn mower LM3 from a rear portion of the fore-and-aft chamber portion. Brake 60 and reduction gear train 70 are disposed in the fore-and-aft chamber portion of gear chamber 140b, and axle 6 is supported in the axle chamber portion of gear chamber 140b.

Outside housing 142 is formed therein with a motor chamber 140a on the lateral distal side of the fore-and-aft chamber portion of gear chamber 140b and forward of the axle chamber portion of gear chamber 140b so as to incorporate motor 5. Motor chamber 140a has a laterally distal vertical opened end onto which a vertical plate-shaped stator base 143 is fixed so as to cover the end opening of motor chamber 140a. In motor chamber 140a, stator core 51a of motor 5 is fixed to a laterally proximal vertical surface of stator base 143. Stator base 143 is formed at a laterally distal side portion thereof as cable-collection box 17. A cable connection guide 17a is fixed into a front end portion of stator base 143, i.e., cable-collection box 17 of motor 5, and projects outward from stator base 143, i.e., outward from transaxle housing 140.

A hollow motor driver base 144 is fixed onto a laterally distal vertical surface of stator base 143, i.e., an outer side surface of cable-collection box 17. Motor driver 10 is fixed onto a laterally distal open end of motor driver base 144. Fins 10b of motor driver 10 are inserted into motor driver base 144 via the laterally distal opened end of motor driver base 144. Motor driver base 144 can be removed from cable-collection box 17 of stator base 143 so as to easily expose cable-collection box 17, thereby improving ease of maintaining cable-collection box 17.

Motor chamber 140a is a wet chamber supplied therein with oil so that motor 5 in motor chamber 140a is soaked in the oil so as to be cooled and so that an inner surface of motor driver 10 is exposed to the oil in motor chamber 140a so as to be cooled. In this regard, each of stator base 143 with cable-collection box 17 and motor drive base 144 is provided with a through hole, or is hollow, so as to enable passage of the oil between motor and motor driver 10. Cable connection guide 17a is made of oil-resisting material, such as silicon, so as to protect cable 89 passed therethrough from oil in motor chamber 140a. Due to the above-mentioned arrangement of cable-connection guide 17a projecting outward from transaxle housing 140, cable 89 is extended from an outer portion of motor driver 10 outside of transaxle housing 140 and is connected to cable-collection box 17 of motor 5 through cable connection guide 17a so that portions of motor 5 and motor driver 10 connected to cable 89 are disposed outside of transaxle housing 140 free from the oil in motor chamber 140a of transaxle housing 140, and cable 89 is free from the oil in motor chamber 140a.

To fix transaxle housing 140 of transaxle 30 to sub frame 2, it is assumed that the laterally proximal end surface of outside housing 141 is fixed to each of right and left ends of sub frame 2, e.g., each of flanges 28 of sub frame 20 or each of flanges 127 of sub frame 120. Transaxle 130 fixed to sub frame 2 has reduction gear train 70 on the lateral distal side of sub frame 2 and has motor 5, cable-collection box 17 and motor driver 10 on the lateral distal side of reduction gear train 70. Therefore, the space in main housing 21 of sub frame 20, or the space in main housing 121 of sub frame 120, which should have incorporated motor housing 41 of transaxle 30 and motor driver 10, becomes a free space in which any other member, such as a battery 11, may be disposed. Alternatively, sub frame 2 may be miniaturized so as to reduce the free space.

Incidentally, transaxle 130 shown in FIG. 11 has an end portion of motor shaft 53 projecting outward from inside housing 141 on the proximal side of inside housing 141 opposite to cable-collection box 17 in the lateral direction of lawn mower LM, and cooling fan 18 is fixed on this end portion of motor shaft 53 so as to be disposed in main housing 21 of sub frame 20 or main housing 121 of sub frame 120, for example. Alternatively, an end portion of motor shaft 53 may project outward from cable-collection box 17 on the laterally distal side of cable-collection box 17, and cooling fan 18 may be fixed on this end portion of motor shaft 53 between cable-collection box 17 and motor driver 10. Therefore, cooling fan 18 can be removed from the inside space of main housing 21 or 121 so as to further expand the free space in main housing 21 or 121.

Figure 12:
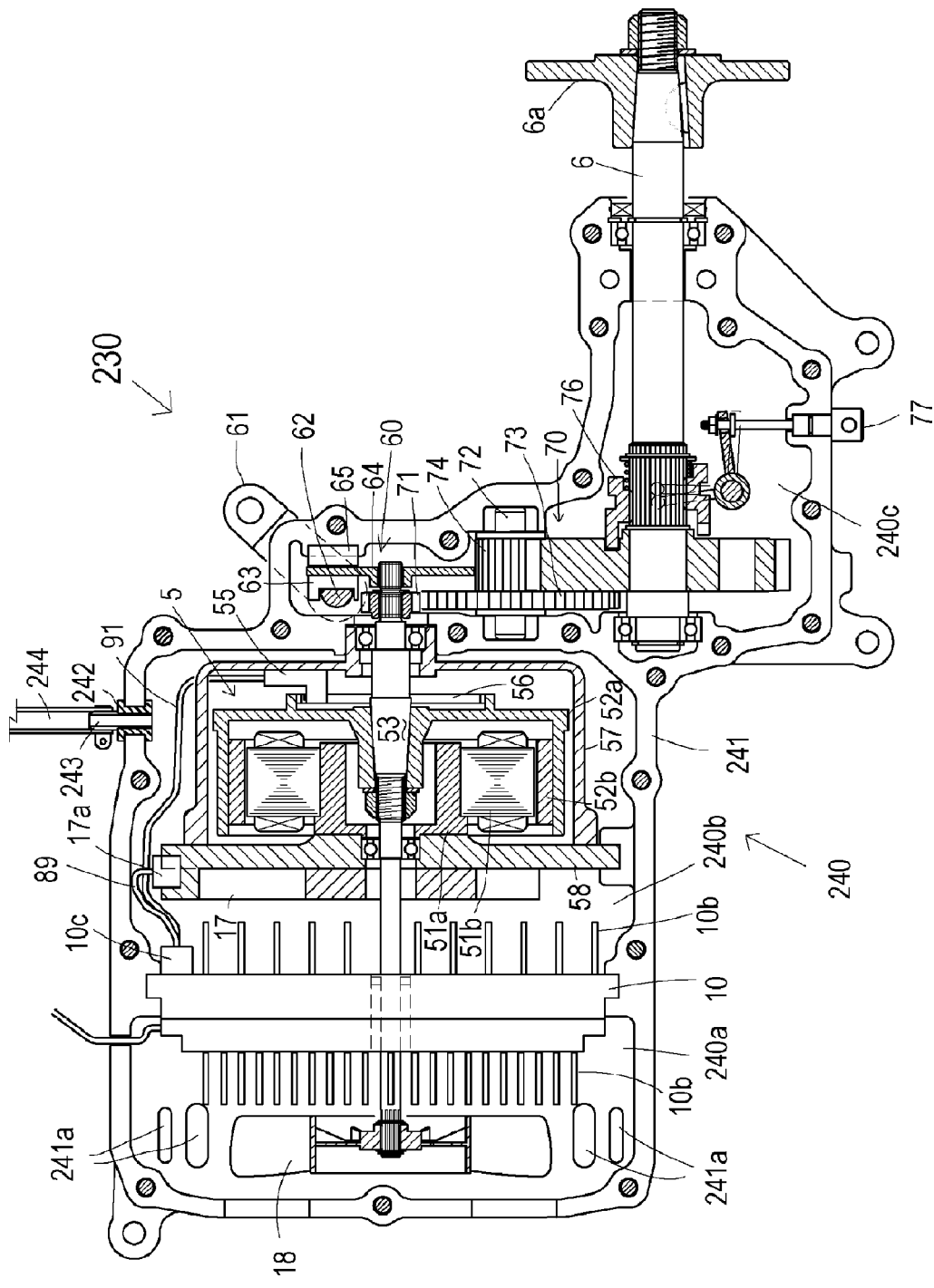
FIG. 12 is a sectional plan view of an alternative transaxle 230 having a transaxle housing 240 which is dividable into upper and lower housing halves 241 by a horizontal joint surface and which incorporates a motor driver 10.
Figure 13:
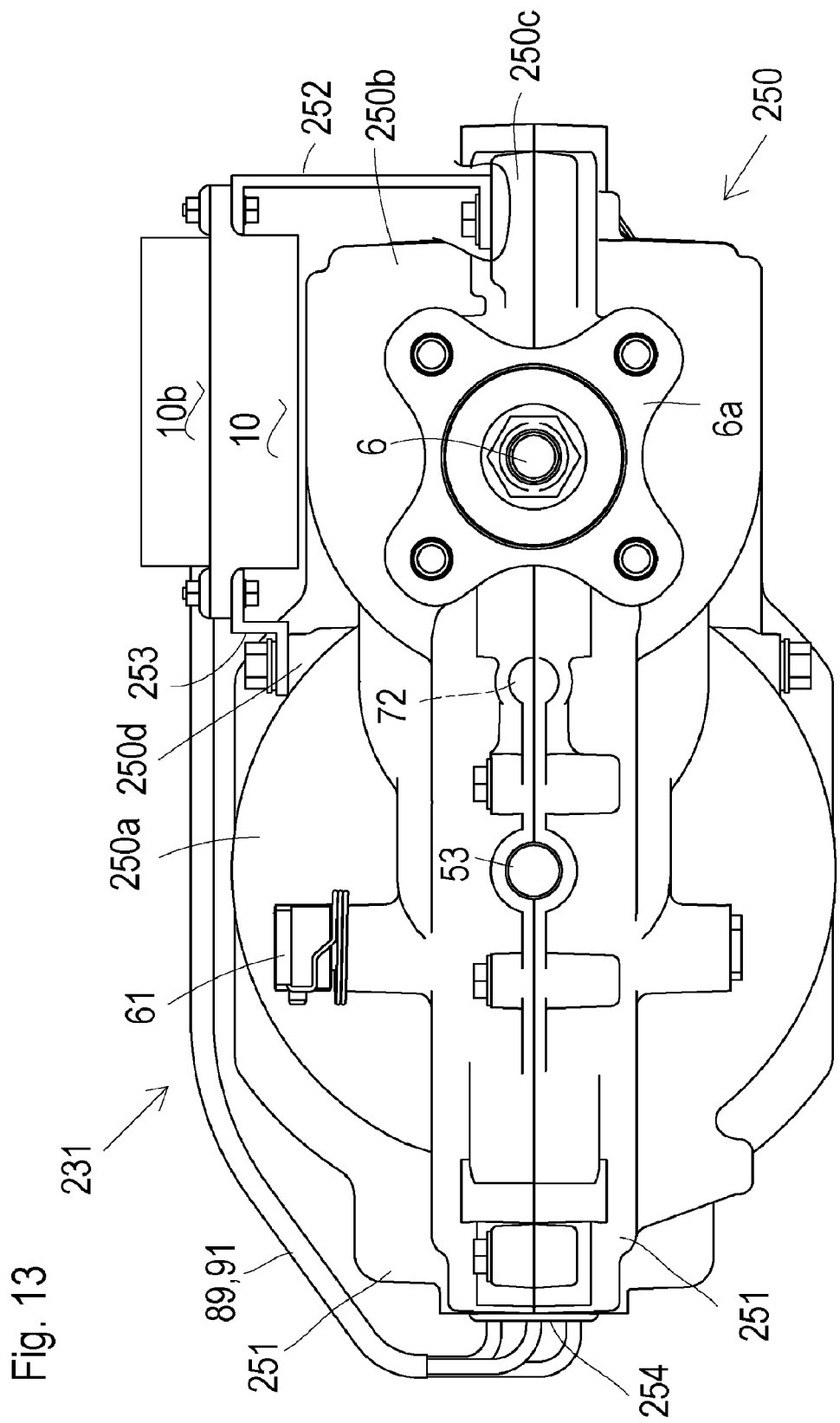
FIG. 13 is a side view of an alternative transaxle 231 having a transaxle housing 250 which is dividable into upper and lower housing halves 251 by a horizontal joint surface when motor driver 10 is mounted onto an upper outside portion of transaxle housing 250.
Figure 14:
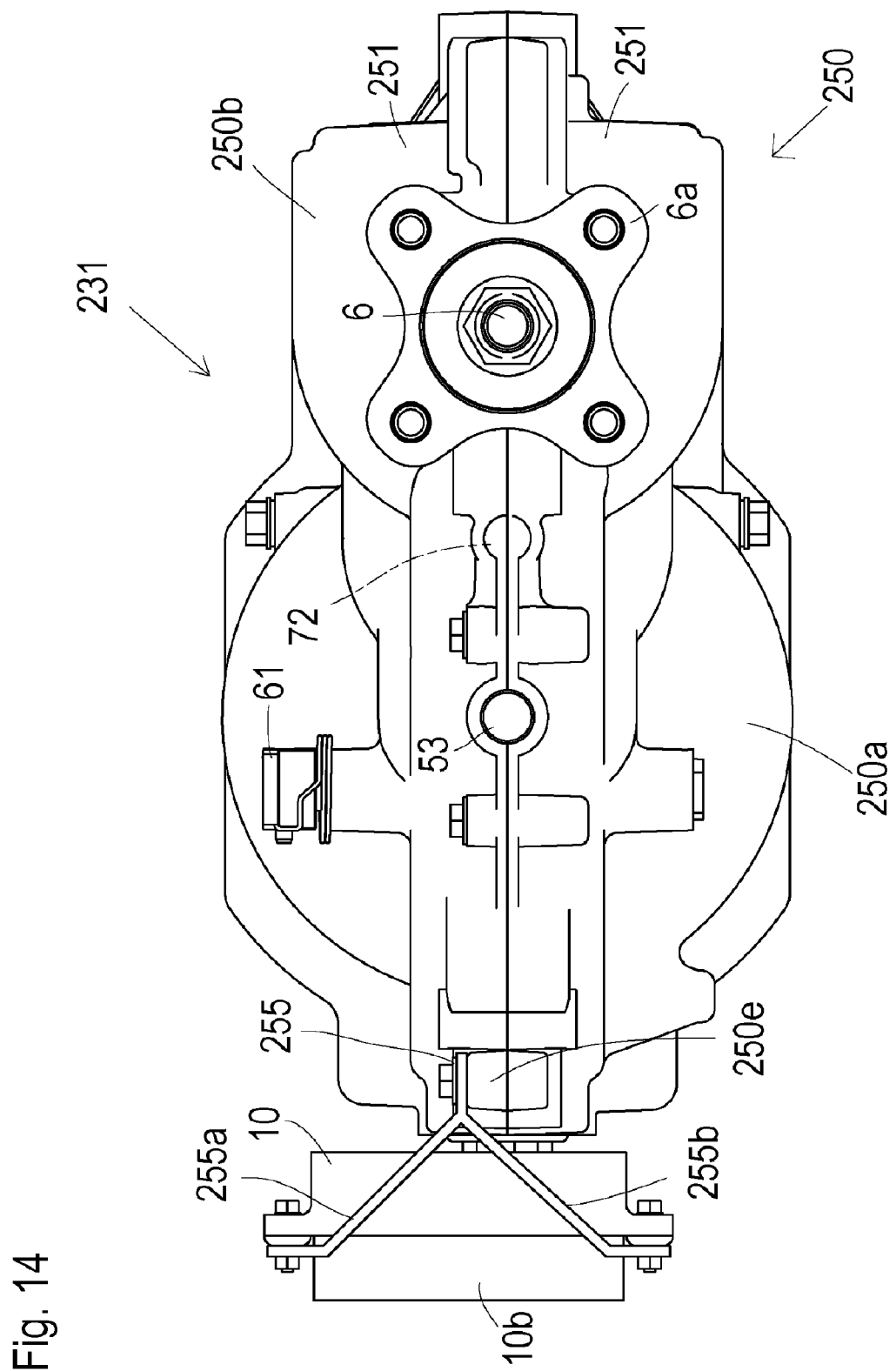
FIG. 14 is a side view of a transaxle 231 when motor driver 10 is mounted onto a front outside portion of transaxle housing 250.

Description will be given of an alternative transaxle 230 shown in FIG. 12, which is adaptable as either transaxle 3R or 3L of lawn mower LM. Transaxle 230 includes a transaxle housing 240, which is formed by joining upper and lower housing halves 241, i.e., which is dividable into upper and lower housing halves 241 by the horizontal joint surface, and respective axes of motor shaft 53 and axle 6 are disposed on this joint surface so that upper and lower housing halves 241 clamp motor shaft 53 and axle 6 therebetween. Upper and lower housing halves 241 may be symmetric with respect to the joint surface. Later-discussed FIGS. 13 and 14, illustrating a transaxle 231 having a transaxle housing 250 formed by joining upper and lower housing halves 251, should be referred to regarding this structure of transaxle 230. Incidentally, in this embodiment, counter shaft 72 of reduction gear train 70 also has its axis on the joint surface. Alternatively, the axis of counter shaft 72 may deviate upward or downward from the joint surface so as to be supported by only one of upper and lower housing halves 241.

Transaxle housing 240 defined as mutually joined upper and lower housing halves 241 is formed therein with a motor chamber 240b incorporating motor 5, with a gear chamber 240c on the laterally distal side of motor chamber 240b so as to incorporate brake 60, reduction gear train 70 and axle 6, and with a cooling fan chamber 240a on the laterally proximal side of motor chamber 240b so as to incorporate a laterally proximal axial end portion of motor shaft 53 projecting from motor chamber 240b and cooling fan 18 fixed on this end portion of motor shaft 53.

Cooling fan chamber 240a and motor chamber 240b are essentially formed as a single chamber, which is fittingly provided therein with vertical motor driver 10 so as to be divided by motor driver 10 into cooling fan chamber 240a and motor chamber 240b. Housing halves 241 joined to each other are formed with air holes 241a in respective portions thereof defining cooling fan chamber 240a so that cooling fan 18 introduces air from an outside space of transaxle 230 into cooling fan chamber 240a. Cooling fan chamber 240a is a dry chamber, and motor driver 10 is formed with fins 10b extended into cooling fan chamber 240a so that the air introduced into the cooling fan chamber 240a via air holes 241a is blown onto fins 10b in cooling fan chamber 240a so as to efficiently cool motor driver 10. Further, motor chamber 240b is a wet chamber filled with oil. Therefore, motor driver 10 is exposed at the laterally distal side end surface thereof to the oil in motor chamber 240b, thereby being cooled by the oil.

In motor chamber 240b, a vertical stator base 58 is fittingly fixed to transaxle housing 240, and stator core 51a of motor 5 is fixed to stator base 58. A motor shaft supporter 57 is disposed so as to surround stator 51 and rotor 52 of motor 5 and is fixed to stator base 58. motor shaft supporter 57 has a portion fitted into a wall of transaxle housing 240 between motor chamber 240b and gear chamber 240c. Motor shaft 53 extended from rotor 52 is journalled by this portion of motor shaft supporter 57 via a bearing and is extended at a laterally distal axial end thereof into gear chamber 240c. In motor chamber 240b, rotary speed sensor 55 is fixed on motor shaft supporter 57 so as to face detected members 56 on rotor drum 52a.

Cable-collection box 17 is formed on a laterally proximal side portion of stator base 58 facing motor driver 10. Incidentally, in this embodiment, motor driver 10 is also formed with fins 10b extended into motor chamber 240b (and toward cable-collection box 17) opposite to the above-mentioned fins 10b in cooling fan chamber 240a. If motor chamber 240b is adapted as a dry chamber into which a cooling air is introduced, the cooling air introduced into motor chamber 240b can be blown onto fins 10b in motor chamber 240b so as to efficiently cool motor driver 10. A cable connection guide 10c is made of oil-resisting material, such as silicon, and is fixed to motor driver 10. Cable 89 extended to cable-collection box 17 of motor 5 and cable 91 extended to rotary speed sensor 55 are guided by cable connection guide 10c so as to be connected to motor driver 10. Oil-resisting cable connection guide 17a is fixed on cable-collection box 17 and guides the connection of cable 89 to cable-collection box 17. Therefore, even in the condition that cables 89 and 91 are extended in motor chamber 240b so as to be exposed to the oil in motor chamber 240b, oil-resisting cable connection guide 17a of cable-connection box 17 of motor 5 and oil-resisting cable connection guide 10c of motor driver 10 surely protect an electric connection portion of motor 5 to cable 89 and an electric connection portion of motor driver 10 to cables 89 and 91 from the oil in motor chamber 240b.

A breather 243 is fitted through a rubber sleeve 242 clamped between upper and lower housing halves 241 and projects outward from transaxle housing 240 so as to be connected to a breather pipe 244. Breather pipes 244 extended from right and left transaxles 230 may be connected to a labyrinth box (not shown).

Transaxle 231 shown in FIGS. 13 and 14 will be described. Transaxle housing 250 of transaxle 231 includes upper and lower housing halves 251 which are joined to each other through a horizontal joint surface so as to clamp motor shaft 53, counter shaft 72 and axle 6 having respective axes on the joint surface. Upper and lower housing halves 251 are substantially symmetric with respect to the joint surface. On the assumption that motor shaft 53 is disposed forward of axle 6, transaxle housing 250 is formed with a motor chamber portion 250a at front portion thereof so as to incorporate motor 5 and is formed with an axle support portion 250b at a rear portion thereof so as to support axle 6.

Referring to FIG. 13, horizontal motor driver 10 is disposed above a horizontal top surface of axle support portion 250b of transaxle housing 250. A connection member 252 is extended downward from a rear end of motor driver 10 and is fastened via a bolt onto a boss 250c formed on axle support portion 250b adjacent to axle 6. A connection member 253 is extended downward from a front end of motor driver 10 and is fastened via a bolt onto a boss 250d formed on a rear upper portion of motor chamber portion 250a. Cables 89 and 91 are extended forward from motor driver 10 and are introduced into motor chamber portion 250a via a cable connection guide 254 clamped to front end walls of upper and lower housing halves 251.

Referring to FIG. 14, vertical motor driver 10 is disposed forward of a front end of motor chamber portion 250a of transaxle housing 250. A connection member 255 is fastened via a bolt onto one of upper or lower end surfaces of a boss 250e formed on transaxle housing 250 adjacent to motor chamber portion 250a. Connection member 255 is bifurcated so as to have an upper portion 255a, which is extended forwardly upward and is connected to a top end of motor driver 10, and a lower portion 255b, which is extended forwardly downward and is connected to a bottom end of motor driver 10. In the embodiment of FIG. 14, motor driver 10 is disposed outside of transaxle housing 250; however, it is adjacent to motor chamber portion 250a of transaxle housing 250, thereby greatly shortening cables 89 and 91 extended from motor driver 10 into motor chamber portion 250a.

Electric lawn mower LM, which may be any one of lawn mowers LM1, LM2 and LM3 according to any one of the above-mentioned embodiments or to another embodiment, may be provided at a suitable portion thereof with a socket electrically connected to contactor 12a of controller 12. Therefore, any electric implement, e.g., an electric tool, an illuminator, a radio, a television, a refrigerator, or a drainage pump, can be connected to the socket to be supplied with electric power from batteries 11.

What is claimed is:

1. An electric lawn mower comprising:
a main frame;
a mower deck supported by the main frame;
a castor supported by the main frame;
a sub frame;
a pair of transaxles, each of the transaxles including:
a transaxle housing,
an electric motor disposed in the transaxle housing,
a single axle supported by the transaxle housing, and
a drive wheel fixed on the axle outside of the transaxle housing; and
a pair of motor drivers for supplying electric power to the respective motors of the respective transaxles,
wherein the sub frame, supporting the transaxles and the motor drivers, is connected to the main frame so as to have the transaxles and the motor drivers below the main frame.

2. The electric lawn mower according to claim 1, further comprising:
a controller supported by the sub frame below the main frame so as to control the motor drivers.

3. The electric lawn mower according to claim 1, further comprising:
a battery supported by the sub frame below the main frame so as to serve as an electric power source for the motor drivers.

4. The electric lawn mower according to claim 3, wherein the mower deck is supported by the main frame between the castor and the drive wheels, and wherein the battery is supported by the sub frame between the mower deck and the drive wheels.

5. The electric lawn mower according to claim 4, wherein the battery is supported by the sub frame between the transaxles.

6. The electric lawn mower according to claim 1, further comprising:
a grass tank; and
a grass-discharging duct extended from the mower deck to the grass tank and between the transaxles.

7. The electric lawn mower according to claim 1, each of the transaxles further including:
a motor shaft of the motor supported in the transaxle housing and having a portion projecting outward from the transaxle housing; and
a cooling fan provided on the portion of the motor shaft so as to be disposed adjacent to each of the motor drivers.

8. The electric lawn mower according to claim 1, wherein the transaxle housing of each of the transaxles is filled therein with oil, and incorporates the corresponding motor driver exposed to the oil in the transaxle housing.

9. The electric lawn mower according to claim 8, wherein each of the transaxles is provided with a cable whose connection to the motor and the motor driver is free from the oil in the transaxle housing.

10. The electric lawn mower according to claim 9, wherein the motor and the motor driver have respective portions connected to the cable outside of the transaxle housing of each of the transaxles.

11. The electric lawn mower according to claim 9, wherein the motor and the motor driver are provided with respective oil-resisting cable connection guides for guiding connection of the cable to the motor and the motor driver freely from the oil in the transaxle housing.

12. The electric lawn mower according to claim 1, wherein the main frame includes right and left portions so as to define an inner space of the main frame between the right and left portions when viewed in plan, and wherein the motor drivers are disposed in the inner space of the main frame when viewed in plan.

13. The electric lawn mower according to claim 12, wherein the electric motors of the respective transaxles are disposed in the inner space of the main frame when viewed in plan.

14. The electric lawn mower according to claim 13, wherein the motor drivers are disposed between the electric motors of the respective transaxles.

15. The electric lawn mower according to claim 14, wherein the sub frame is extended between the transaxles so as to incorporate the electric motors and the motor drives.

16. The electric lawn mower according to claim 14, wherein a battery is supported by the sub frame between the motor drivers.

17. The electric lawn mower according to claim 16, wherein the sub frame is extended between the transaxles so as to incorporate the electric motors, the motor drives and the battery.

18. The electric lawn mower according to claim 13, wherein the motor drivers are disposed above the respective electric motors of the respective transaxles.

19. The electric lawn mower according to claim 18, further comprising:
a grass-discharging duct extended in the inner space of the main frame when viewed in plan from the mower deck and between the electric motors of the respective transaxles, wherein each of the electric motors and each of the motor drivers are disposed between the grass-discharging duct and each of the right and left portions of the main frame when viewed in plan.

20. The electric lawn mower according to claim 19, wherein a battery is supported by the sub frame in the inner space of the main frame when viewed in plan between the grass-discharging duct and the right or left portion of the main frame.

21. The electric lawn mower according to claim 19, wherein the sub frame includes a first portion extended between the transaxles above the grass-discharging duct so as to support the motor drives, and includes a pair of second portions each of which is extended downward from the first portion between the grass-discharging duct and each of the transaxles so as to support each of the electric motors.

22. The electric lawn mower according to claim 21, wherein the sub frame further includes a third portion extended forward or rearward from at least one of the second portions so as to support a battery in the inner space of the main frame when viewed in plan between the grass-discharging duct and the right or left portion of the main frame.

* * * * *